(12) United States Patent
Coleman et al.

(10) Patent No.: US 8,033,674 B1
(45) Date of Patent: Oct. 11, 2011

(54) OPTICAL COMPONENTS AND LIGHT EMITTING DEVICES COMPRISING ASYMMETRIC SCATTERING DOMAINS

(75) Inventors: Zane Coleman, Chicago, IL (US); Terence Yeo, Boston, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

(21) Appl. No.: 12/871,796

(22) Filed: Aug. 30, 2010

Related U.S. Application Data

(63) Continuation of application No. 11/828,172, filed on Jul. 25, 2007, now Pat. No. 7,784,954.

(60) Provisional application No. 60/820,241, filed on Jul. 25, 2006.

(51) Int. Cl.
*F21V 9/14* (2006.01)

(52) U.S. Cl. .......... 362/19; 362/558; 362/560; 362/607; 362/613; 362/627; 359/483.01; 359/493.01

(58) Field of Classification Search .............. 362/19, 362/558, 560, 600, 607, 611, 613, 621, 624, 362/627; 349/112; 359/483, 483.01, 493.01
See application file for complete search history.

(56) References Cited

U.S. PATENT DOCUMENTS

| | | | |
|---|---|---|---|
| 6,179,948 B1 * | 1/2001 | Merrill et al. | 156/229 |
| 6,995,820 B2 * | 2/2006 | Amimori et al. | 349/112 |
| 7,784,954 B1 * | 8/2010 | Coleman | 362/19 |

* cited by examiner

*Primary Examiner* — Stephen F Husar
*Assistant Examiner* — Meghan K Dunwiddie

(57) ABSTRACT

The present invention provides a polarization-sensitive light homogenizer and a backlight and display using the same. The homogenizer improves the spatial luminance and color uniformity, increases the luminance in a direction normal to the homogenizer and provides increased luminance through polarized light recycling within the light homogenizer and backlight. In one embodiment, the homogenizer includes a polarization-sensitive anisotropic light-scattering (PDALS) region, a non-polarization-sensitive anisotropic light-scattering region, and a substantially non-scattering region. In a further embodiment, the non-scattering region is birefringent. The spatially non-uniform incident light flux from a backlight including one or more non-extended light emitting sources is scattered efficiently by the NPDASL region and is incident on the PDALS region which backscatters light orthogonal to the polarization state desired for efficient illumination of a liquid crystal display panel. The NPDASL and the PDALS form a multiple reflection cavity that will increase the spatial luminance while improving the light recycling of the appropriate polarization state. In a further embodiment the light homogenizer includes at least one of a light collimating region and a light re-directing region.

23 Claims, 9 Drawing Sheets

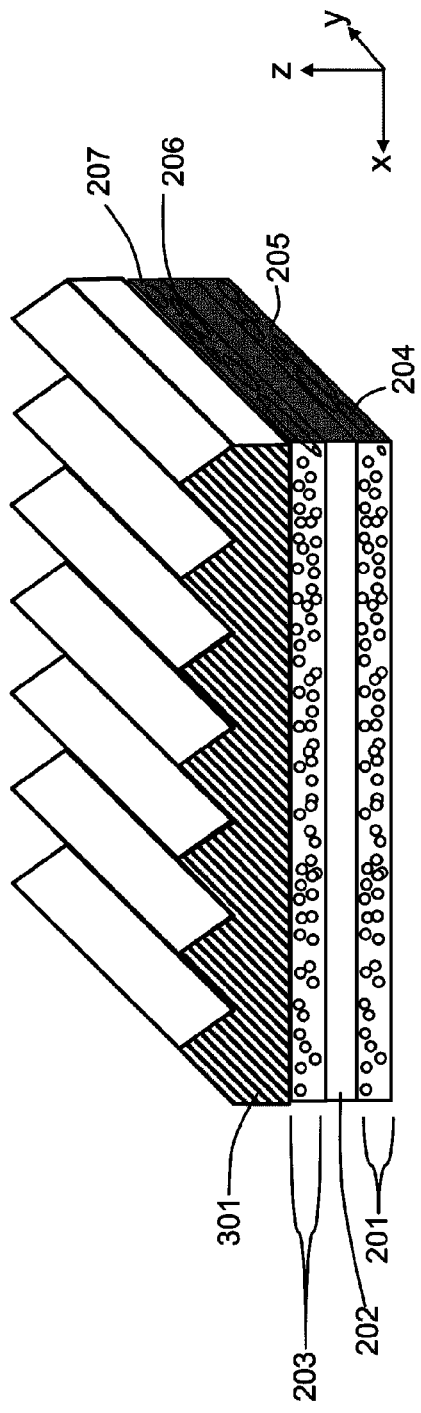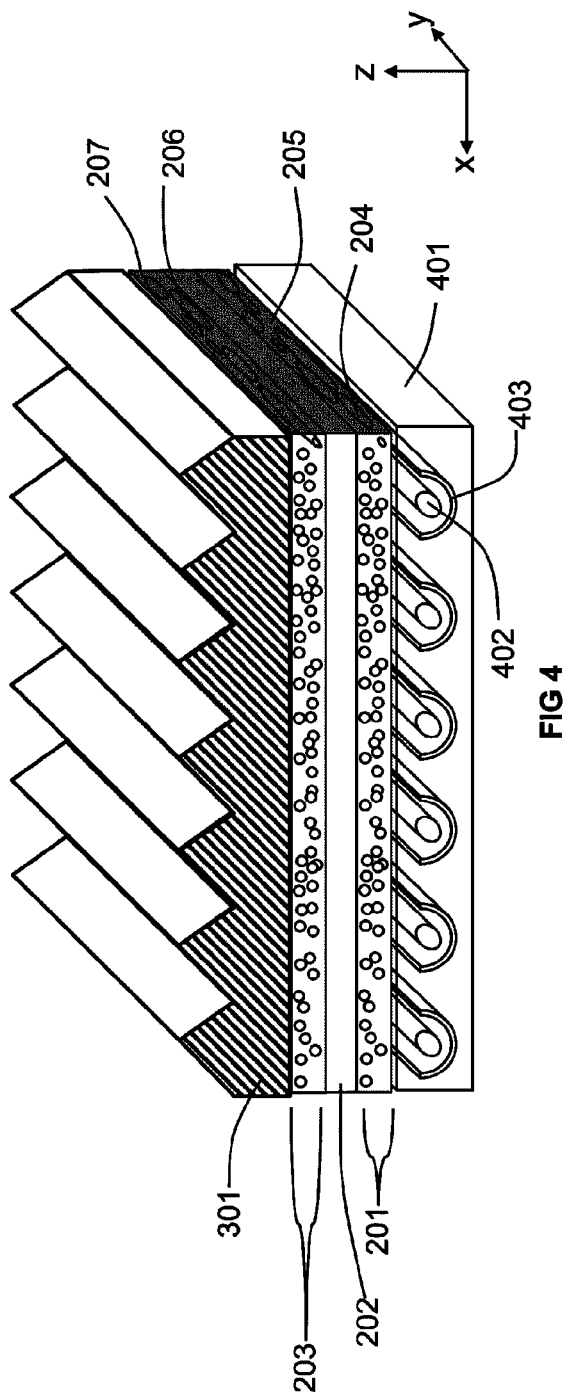

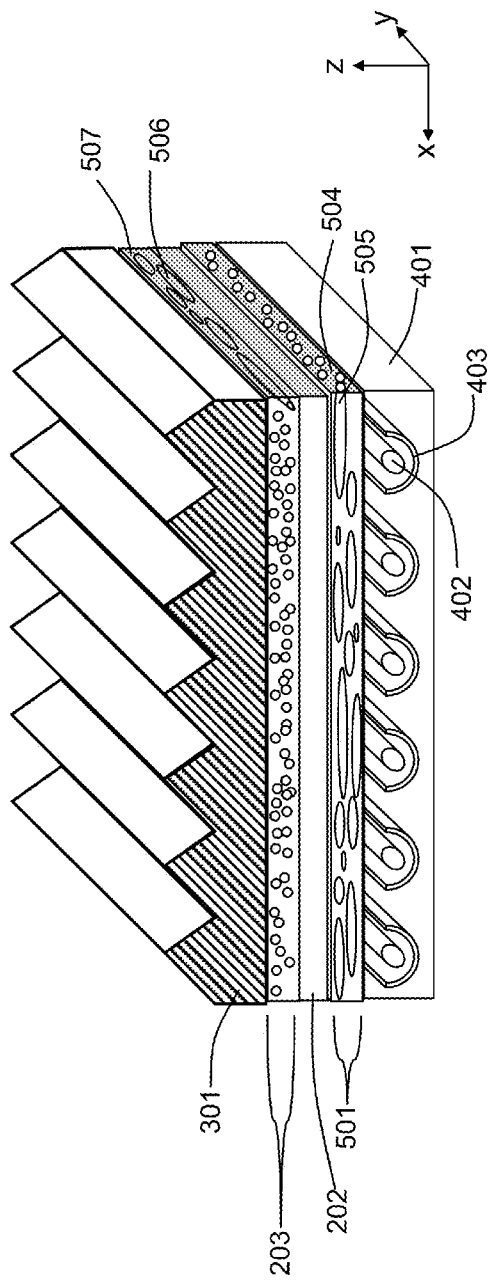
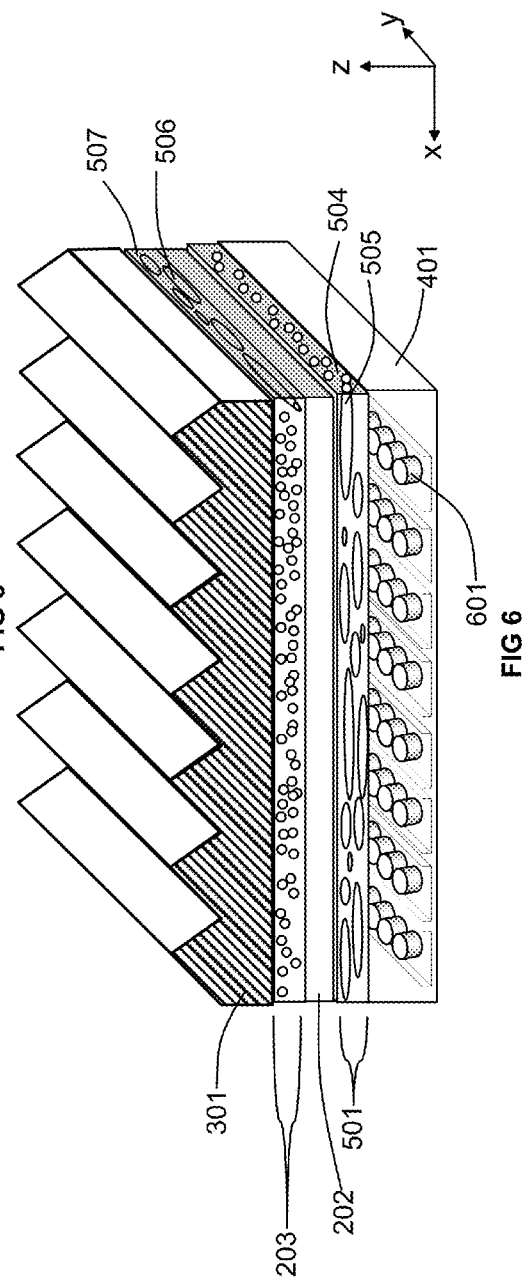

US 8,033,674 B1

OPTICAL COMPONENTS AND LIGHT EMITTING DEVICES COMPRISING ASYMMETRIC SCATTERING DOMAINS

RELATED APPLICATION

This non-provisional application is a continuation of U.S. non-provisional application Ser. No. 11/828,172 filed Jul. 25, 2007 with issue date Aug. 31, 2010 as U.S. Pat. No. 7,784,954. Application Ser. No. 11/828,172 claims the benefit of U.S. Provisional Application No. 60/820,241 filed Jul. 25, 2006, the entire teachings of which are incorporated herein by reference.

BACKGROUND

Conventional liquid-crystal-display (LCD) backlights for large displays have conventionally employed multiple lamps to provide sufficient brightness over a large area. Typically, these spatially non-uniform, directly illuminated backlights are used for television and large display applications and contain linear arrays of fluorescent lamps with reflectors. In order to provide a uniform intensity profile from the surface of the backlight before passing through the LCD panel, volumetric diffuser plates or films are used to "spread-out" or diffuse the light from the linear array of fluorescent lights so as to eliminate the visibility of linear "hot spots" or non-uniformities in the backlight luminance.

With the emergence of light-emitting diodes (LED's) as new light sources for backlights, the LED's are often employed in linear or grid arrays and may include separate red, green and blue LED packages or all three within the same package. Backlights employing LED's not only have to improve the luminance uniformity using films, plates, and housings, but they also need to improve the color uniformity. This is often accomplished by simply increasing the amount of diffusion and not taking into account the loss in efficiency resulting by using diffusers with symmetric forward scattering profiles.

For many display applications, such as for some televisions, the viewing angle in the vertical direction is reduced such that the brightness in the forward direction is increased. This light is typically directed from higher vertical angles closer to the normal to the display using collimating films, such as prismatic brightness enhancement films. Additional films, such as reflective polarizers are often used, such as dual brightness enhancement film (DBEF) from 3M (St. Paul, Minn., US). The patent literature refers to scattering reflective polarizers (U.S. Pat. Nos. 5,825,543 and 5,751,388); however, the systems described in these patents are not optimized to take into account the spatial non-uniformity of the light sources and the requirements needed to achieve spatial luminance uniformity, spatial color uniformity, as well increased head-on luminance. Using multiple films to attempt to achieve properties, such as spatial luminance uniformity, is optically inefficient due to the multiple interfacial reflections; and the manufacturing and assembly costs are higher. A more-efficient optical system for reducing the non-uniformities is needed to reduce the number of lamps (to provide a lowercost system) or to reduce the brightness of the lamps (wherein longer-lifetime or lower-cost lamps could be used) in a system with a reduced cost.

It is known that anisotropic diffusers can improve the luminance uniformity of backlights with spatially non-uniform light sources; however, greater system efficiency is desired in order to improve the system luminance and color uniformity as well as luminance uniformity while also achieving increased luminance.

The use of multiple films within an LCD backlight increases the production costs, increases the likelihood of dust and blemishes, and increases the part count and thickness. There is a need for fewer components for backlights that have collimation properties, sufficient diffusion for light homogenization and light recycling properties combined together in order to help alleviate these problems and that can be manufactured in a low-cost simple method. There is a need for a component for a backlight with increased spatial luminance uniformity and increased luminance in a particular direction. In newer LED-based backlights, increased color uniformity is important.

SUMMARY

Disclosed herein is a polarization-sensitive light homogenizer and a backlight and display using the same. The homogenizer improves the spatial luminance and color uniformity, increases the luminance in a direction normal to the homogenizer and provides increased luminance through polarized light recycling within the light homogenizer and backlight. The homogenizer includes a polarization-dependent anisotropic light-scattering (PDALS) region, a non-polarization-dependent anisotropic light-scattering (NPDALS) region and a substantially non-scattering region. In a further embodiment, the non-scattering region is birefringent. The spatially non-uniform incident light flux from a backlight including one or more non-extended light-emitting sources is scattered efficiently by the NPDALS region and is incident on the PDALS region, which backscatters light orthogonal to the polarization state desired for efficient illumination of a liquid-crystal-display panel. The NPDALS and the PDALS form a multiple reflection cavity that will increase the spatial luminance while improving the light recycling of the appropriate polarization state.

In a further embodiment, the light homogenizer includes a light-collimating region optically coupled to another region. The light-collimating region increases the luminance of the backlight and illuminated display along a direction normal to the backlight. In a further embodiment, the light homogenizer includes a light re-directing region to redirect incident light at steep angles from a waveguide based backlight into angles closer to the backlight normal. Other embodiment includes spatially varying scattering regions, multiple PDALS or NPADLS regions, light coupling directly into the edge of one of the regions, domains within a light-scattering region containing shells that create destructive interference, domains with high flexural modulus that increase the flexural modulus of the light homogenizer.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

FIG. 3 is a perspective view of one embodiment of a polarization-sensitive light homogenizer including a PDALS region and a NPDALS region separated by a non-scattering birefringent region and a light collimating region.

FIG. 4 is a perspective view of one embodiment of backlight including a polarization-sensitive light homogenizer including a linear array of fluorescent bulbs, a PDALS region and a NPDALS region separated by a non-scattering birefringent region and a light-collimating region.

FIG. 5 is a perspective view of one embodiment of backlight including a polarization-sensitive light homogenizer including a linear array of fluorescent bulbs, a PDALS region and a NPDALS region separated by a non-scattering birefringent region and a light collimating region wherein the light-scattering domains in the NPDALS and PDALS regions are asymmetric in shape and aligned substantially orthogonally.

FIG. 6 is a perspective view of one embodiment of backlight including a polarization-sensitive light homogenizer including a grid array of LED's, a PDALS region and a NPDALS region separated by a non-scattering birefringent region and a light collimating region wherein the light-scattering domains in the NPDALS and PDALS regions are asymmetric in shape and aligned substantially orthogonally.

DETAILED DESCRIPTION

Figure 1:
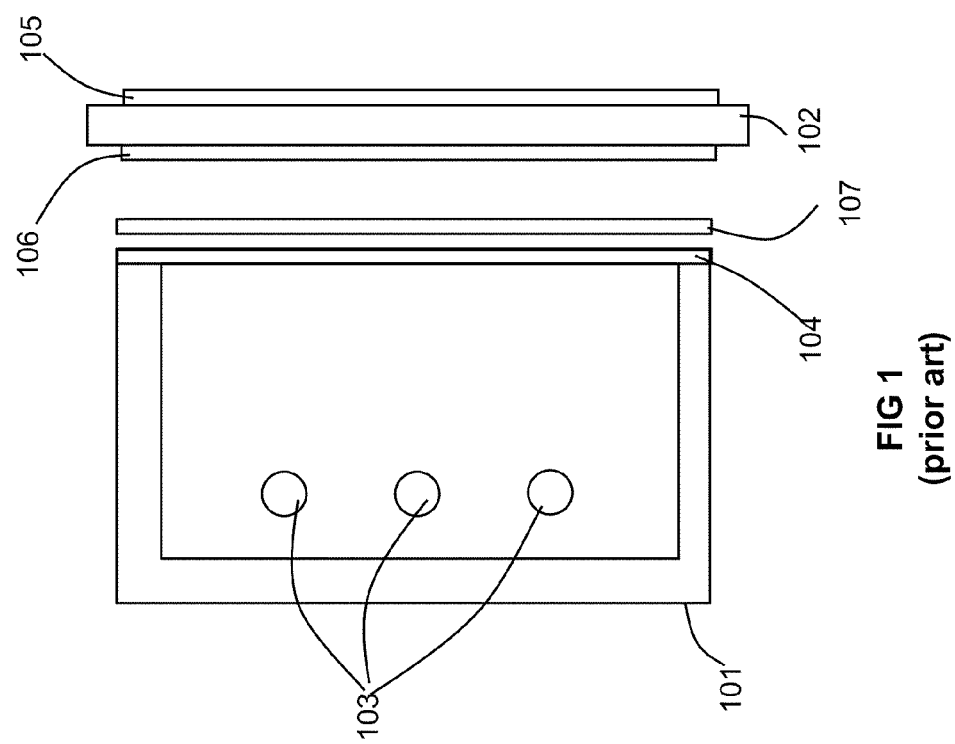
FIG. 1 is perspective view of a backlight and liquid crystal cell incorporating a polarization selective scattering element of the prior art.

The features and other details of the invention will now be more particularly described. It will be understood that particular embodiments described herein are shown by way of illustration and not as limitations of the invention. The illustrations are not drawn to scale in order to illustrate particular features and properties. The principal features of this invention can be employed in various embodiments without departing from the scope of the invention. All parts and percentages are by weight unless otherwise specified.

DEFINITIONS

For convenience, certain terms used in the specification and examples are collected here.

"Diffuse" and "diffusing," as defined herein, include light scattering or diffusion by reflection, refraction or diffraction from domains, surfaces, or layers or regions.

"Diffuser region" and "Diffuser Film" and "Diffuser" and "light-scattering region" are referred to herein as optical regions or elements such as films or plates that provide a scattering or diffusion property to one or more light rays. The change in angle of a light ray may be due to refraction, reflection, diffusion, diffraction or other properties known to change the direction incident light.

"Polarizer," as defined herein, includes absorbing or reflecting polarizers. These include dye and iodine based polarizers and reflective polarizers, such as DBEF from 3M. Linear or circular polarizers are also included.

"Polarization-sensitive" and "polarization-dependent" as referred to herein refer to materials, effects, or properties that may vary depending on the polarization state of the incident electromagnetic radiation. "Polarization-insensitive" and "non-polarization-dependent" and "polarization independent" refer to herein to materials, effects, or properties that are substantially independent of the polarization state of the incident electromagnetic radiation.

"Optically coupled" is defined herein as a condition wherein two regions or layers are coupled such that the intensity of light passing from one region to the other is not substantially reduced by Fresnel interfacial reflection losses due to differences in refractive indices between the regions. "Optically coupling" methods include methods of coupling wherein the two regions coupled together have similar refractive indices or using an optical adhesive with a refractive index substantially near or in-between the regions or layers. Examples of "optically coupling" include lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. In manufacturing, two components may be combined during the forming process, such as extrusion, coating, casting or molding. For example, two layers may be co-extruded together such that they are bonded or cured in contact with each other. In these instances, the layers or regions are referred to as being optically coupled herein.

"Prismatic" or "Prismatic sheet" or "Prismatic structure" is defined herein as a surface relief structure that refracts or reflects light toward a desired direction. This refraction and reflection can provide collimating properties to light passing through the film. The structure can include arrays of elongated prism structures, micro-lens structures, and other surface relief structures. These features can be defined by a cross-sectional profile, surface roughness, or by other surface characterization means.

"Collimating region," "Collimating Film" and "Collimating structures" are defined here as films or structures wherein more of the light rays exiting the film or structures are directed toward the surface normal of the component, film or substrate plane in the case of structures on a substrate. Collimation properties can be achieved by refractive structures, such as prisms, cones, microlenses, pyramids, hemispherical structures or linear, circular, random, regular, semi-random, or planar arrays of the aforementioned structures.

Used herein, "particles" and "domains" refer to individual regions of one or more materials that are distinctly different than their surroundings. They include organic particles, inorganic particles, dispersed domains, and dispersed particles. They are not limited in shape and may be fibrous, spherical, ellipsoidal, or plate-like in shape.

FIG. 1 shows the prior art from U.S. Pat. No. 5,751,388. In this example of a direct-lit display, the backlight includes a light source 103 located within a diffusely reflecting cavity 101. Light from the light source passes through diffuser 104 as well as a polarization-sensitive scattering element (PSSE) 107. Light from the PSSE 107 then passes to the LCD panel portion of the display, which comprises the LCD panel 102, rear polarizer 106 and front polarizer 105. The PSSE is utilized to prepolarize the light prior to reaching the rear display polarizer. The backlight is in the form of a diffusely reflective cavity 101 consisting of white walls and containing fluorescent lamp(s) 103. The PSSE transmits the majority of the light polarized along one optical axis and returns the majority of the light having the orthogonal polarization to the backlight cavity, where its polarization state is changed, giving it another opportunity to increase the intensity of the output in the desired polarization state.

As shown in FIG. 1, the light from the light sources reaches a diffuser which scatters the incident light before reaching the PSSE. These diffusers are typically in the form of diffusion plates that are 2 mm thick, comprising beads dispersed within an acrylic or polycarbonate sheet. These diffusing elements are separate films or plates and are isotropically scattering in the forward direction, and have symmetrical scattering profiles in the horizontal and vertical directions. As a result, these diffusers are typically designed to reflect a significant portion of the incident light (all polarization states and all incident angles), such that the light is recycled and scattered back into a large range of angles (strongly diffusing symmetrical scattering profile) in order to obtain a more uniform spatial luminance profile. A significant amount of this light that is reflected back due to the design of the strong diffuser plate 104 will be absorbed due to multiple bounces off of the "white" diffusely reflecting cavity 101 walls and multiple passes through the slightly absorbing diffusing plate. Additionally, depending on the light source used, a significant amount of light is absorbed within the light source, itself. Such is the case, for example, when fluorescent light sources are used.

Figure 2:
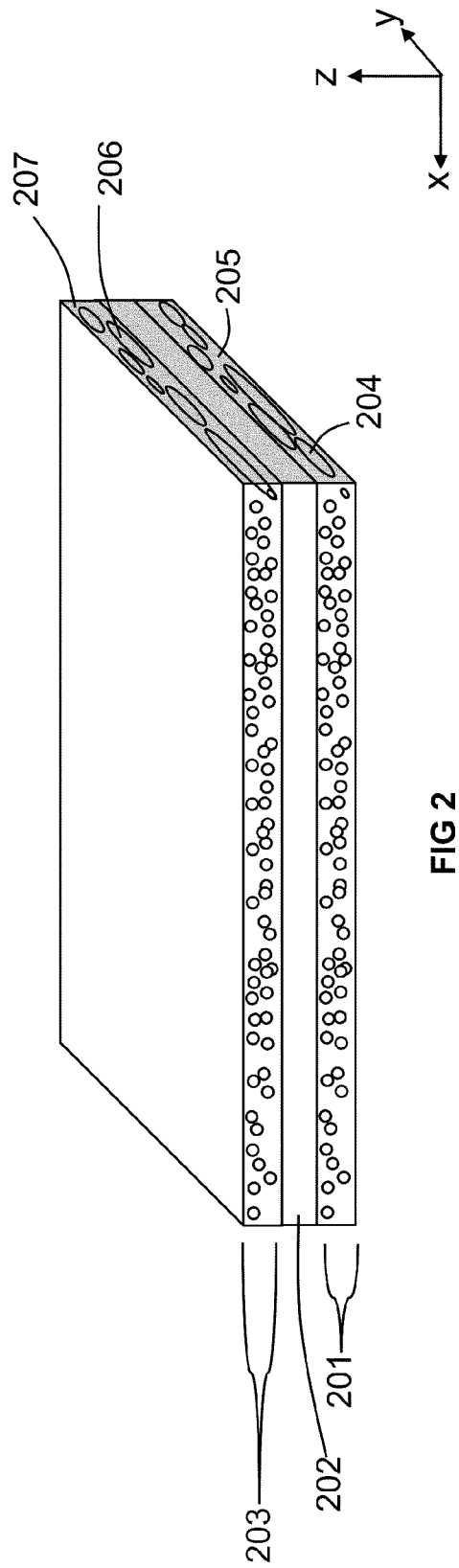
FIG. 2 is a perspective view of one embodiment of a polarization-sensitive light homogenizer including a PDALS region and a NPDALS region separated by a non-scattering birefringent region.

FIG. 2 shows an embodiment of this invention of a polarization-sensitive light homogenizer. The homogenizer is designed to improve the spatial luminance uniformity and color uniformity while minimizing extraneous scatter and resulting absorption, and increase optical efficiency. The homogenizer includes a Non-Polarization-Dependent Anisotropic Light-scattering (NPDALS) region 201, a non-scattering region 202, and a Polarization-Dependent Anisotropic Light-scattering (NPDALS) region 203. In some embodiments, the NPDALS region is optically coupled to the non-scattering region, which is optically coupled to the NPDALS region. In one example, the NPDALS region can be substantially isotropic material disposed in a non-birefringent material. For example, a blend containing a dispersed phase of linear low-density polyethylene in an amorphous glycol-modified polyethylene terephthalate (PETG) matrix that is cast such that the dispersed phase shapes are stretched will anisotropically scatter light independent of polarization state of the incident light. Another example includes polymethyl methacrylate (PMMA) dispersed in a polycarbonate to create a region that is substantially non-polarization dependant. Glass or polymeric fibers dispersed and aligned in a substantially amorphous material are also examples of NPDALS regions. PDALS regions can be created through dispersed blends of materials wherein the refractive index difference in one direction is different than the refractive index difference in another region. Examples include those where the refractive index difference in one direction is substantially different than the refractive index difference in a second direction. One of the refractive index differences may be sufficiently small ($\Delta n<0.001$) such that light of a specific polarization state does not substantially scatter. Examples include birefringent dispersed domains in a non-birefringent matrix such as birefringent polymeric fibers dispersed in an amorphous non-birefringent polymer. Other examples include substantially non-birefringent materials dispersed in a birefringent matrix. Further examples of PDALS can be found in U.S. Pat. Nos. 5,825,543 and 5,751,388, incorporated in their entirety herein as references.

Anisotropic light scattering properties can be achieved by non-spherical domains or surface features that have non-symmetrical cross-sections in a plane perpendicular to the plane of incidence or by non-uniform refractive index differences between two regions or domains in a material. In the former, non-circular cross-sections of domains or surfaces of a first material with an interface to a second material, with the second material have a refractive index different from the first material will generate anisotropic light scattering due to the size and shape dependence of light scattering. In the latter case, when the refractive index difference between two materials at an interface along two directions in a plane perpendicular to the plane of incidence are not equal, the incident light will scatter anisotropically because of the strong effect of the refractive index difference on scattering properties. The major diffusion axis is referred to as the axis in the plane perpendicular to the plane of incidence with the larger angular width at half-maximum intensity. The minor diffusion axis is the axis in the plane perpendicular to the plane of incidence with the smaller angular width at half-maximum intensity.

The regions within the light homogenizer create an internal cavity that increases the light homogenization through multiple reflections and provides uniform spatial luminance when used with spatially non-uniform light sources. The non-scattering region may be a birefringent material. The spatial-luminance profile of incident light, such as that from spatially non-uniform light sources, such as LCD backlights, becomes more spatially uniform in an efficient method by the controlled anisotropic scattering that only scatters light in the desired directions that are needed.

The incident light is scattered from the dispersed first domains 204 within a matrix material 205. One or both of these regions may be made of birefringent or trirefringent materials, such that the refractive index of the first domains $n_{d1x}$, $n_{d1y}$, and the refractive index of the matrix material $n_{m1x}$ and $n_{m1y}$ in the x and y directions are such that $|n_{d1x}-n_{m1x}|>0.005$ and $|n_{d1y}-n_{m1y}|>0.005$. Thus, in effect, there is scattering for both polarization states for light polarized in the x or y directions. This initial scattering is substantially polarization independent such that the light of the desired polarization state (that would subsequently pass through the rear polarizer of a liquid crystal display panel) is also made more spatially uniform. Examples of birefringent regions include PET (poly(ethylene terephthalate)) monoaxiallly stretched such that $n_y=n_z\neq nx$. Examples of tri-refringent regions include PET (poly(ethylene terephthalate)) uniaxially stretched such that $n_y\neq n_z\neq nx$.

In some embodiments, the scattering is anisotropic, such that the full width at half maximum (FWHM) diffusion angles for un-polarized light are such that $FWHM_x\neq FWHM_y$. The light may be anisotropically scattered, such that the Asymmetry Ratio (AR), defined as the ratio of the full-angular width at half maximum diffusion intensity in the major plane (the plane with the larger FWHM) to the full-angular width at half maximum diffusion intensity in the minor diffusion plane, is >2. As illustrated in FIG. 2, the major diffusion plane would be x-z plane and the minor diffusion plane would be the y-z plane; however, it is understood that in another embodiment, these major and minor planes may be in the x-y and x-z planes, respectively or along other directions at angles to the edge of the light homogenizers. In some embodiments, the AR is greater than 8. In particular embodiments, the asymmetry ratio is greater than 20. As illustrated here, the axis and alignment are illustrated for the x and y directions, although it is understood that other angles relative to a film edge and non-perpendicular axis may also be used. The light then passes through a birefringent region 202, which rotates the polarization state by a quarter-wave. This is typically referred to as a quarter-waveplate or material with a retardation of lambda/4, which is typically a retardation of about 138 nm for visible light centered at the peak of 550 nm.

The light of both polarization states is incident on the anisotropic polarization-sensitive light-scattering region 203 comprising dispersed second domains 206 in a matrix material 207. The domains and matrix combinations are chosen such that either of the following conditions apply:

$|n_{d2x}-n_{m2x}|<0.005$ and $|n_{d2y}-n_{m2y}|>0.01$ or $|n_{d2y}-n_{m2y}|<0.005$ and $|n_{d2x}-n_{m2x}|>0.01$.

For the case where $|n_{d2x}-n_{m2x}|<0.005$ and $|n_{d2y}-n_{m2y}|>0.01$, s-polarized light that is linearly polarized parallel to the x axis will pass through the region substantially unscattered. However, light that is linearly polarized along the y axis will encounter the refractive index difference in the y direction between the dispersed second domains and the second matrix material and be reflected, refracted or scattered. If the difference in refractive index along the desired polarization axis is sufficiently large, then a large amount of light will be backscattered and most of the light of that polarization state will not pass through the film.

In some embodiments the refractive index difference along the scattering axis is greater than 0.1. In particular embodiments, the refractive index difference along the scattering axis is greater the 0.3. In some embodiments, the anisotropic polarization-dependent scattering region thickness is substantially small (less than 200 microns), such that the number of multiple-domain scattering events is low, but the amount of backscattering is high due to the high refractive index difference. In particular embodiments, the thickness is less than 100 microns.

The polarized light that is anisotropically scattered backwards may have different backscattering profiles. The light may be anisotropically scattered such that the asymmetry ratio (AR), defined as the ratio of the full-angular width at half maximum diffusion intensity in the x direction to the full-angular width at half maximum diffusion intensity in the y direction, is >2. In some embodiments, the AR is greater than 8. In particular embodiments, the asymmetry ratio is greater than 20. The polarization state of the linearly polarized light that is scattered backward will be rotated due passing back through the birefringent region. A portion of the light polarized in the y direction that is scattered back will backscatter (anisotropically) from the polarization independent anisotropic light-scattering region. A portion of the light will backscatter several times between these two regions, creating a cavity that will increase the spatial luminance. Since the cavity is thin relative to the thickness of traditional direct-lit backlight cavities and can be formed using high transmission materials, fewer absorptive losses (such as those found on other reflective materials) occur. As a result, if the birefringence is optimized for two passes, such as is the case when using a quarter wave birefringent material, the polarization state of a significant portion of light that is scattered back into the birefringent material will be linearly polarized in the x direction and will efficiently pass through the polarization-sensitive anisotropic light-scattering region. The birefringence may be optimized for an even number of passes depending on the level of diffusion and luminance uniformity needed.

In the prior art illustrated in FIG. 1, the symmetric scattering from the diffuser is very inefficient. A symmetric diffuser inefficiently scatters light in all directions and thus the efficiency of the system is reduced. The spatial luminance (or color) uniformity is less optimally spread. In cases where the light sources are linear arrays, such as a linear array of fluorescent lamps or linear or grid arrays of point light sources, such as LED or scattering regions from a waveguide backlight, the scattering is only needed in one or two directions, typically orthogonally and not at angles such as 45 degrees to one of the arrays.

In the embodiment illustrated in FIG. 2, the non-polarization-sensitive anisotropic light-scattering region will efficiently create a cavity within the polarization-sensitive light homogenizer such that a significant amount of the light will undergo multiple scattering reflections that are efficient, such that the angular spread of light is preferential (anisotropic) in the x-z plane, and the spatial luminance or color uniformity is increased in the x direction. In contrast to the prior art, thinner and more-efficient scattering regions can be used since the scattering is only needed in one direction (or preferentially more in one direction).

In a further embodiment of this invention, the non-polarization-sensitive anisotropic light-scattering region scatters incident light in the forward (+z) and backward (−z) directions. Thus, a portion of the light incident at an angle less than 90 degrees from the normal of the region is reflected (−z direction) and transmitted (+z direction). This creates a reflection region (cavity) so that the light reflected from the PDALS region can return efficiently with a rotated polarization state.

In a further embodiment of this invention, the anisotropic light-scattering profile (and thus the domain alignment) of the PDALS region and the NPDALS region are at an angle, theta, with respect to each other. In the embodiment of FIG. 2, the domains are substantially parallel and aligned along the y axis, and thus the major light-scattering planes are substantially parallel and parallel to the x-z plane. In a further embodiment, the domains and resulting light-scattering planes of the PDALS and the NPDALS are substantially perpendicular, such that theta=90 degrees.

FIG. 3 illustrates a further embodiment of a polarization-sensitive light homogenizer including a light-collimating region 301. The light-collimating region 301 serves to redirect a substantial portion of the incident light toward the normal to the substantially planar homogenizer, such that, when viewed from near the normal direction, the luminance is increased. The light collimating features may also provide light-recycling capabilities by totally internally reflecting light from near normal angles back into the NPDALS region, where it can be further scattered and contribute to increased luminance uniformity. This light can be recycled through reflective scattering from other regions or surfaces in the light homogenizer or backlight, such that the spatial or color luminance uniformity is increased by using a thinner light homogenizer. Thus, by using multiple cavities, such as those between the PDALS and NPDALS and also each of these regions and the light-collimating features, the multiple reflections will create multiple "modes" or overlapping ray bundles that will increase the spatial color and luminance uniformity when the light exits the homogenizer. The light-collimating features may be linear, in the form of a grid, random, semi-random or otherwise ordered or in the form of arrays capable of being represented mathematically as repeated or varying structures, including angled, curved, regular, or irregular surface features. Examples include a linear array of prisms, a grid array of corner-cube features, microlens arrays, microlenslet arrays, cylindrical lens arrays, Fresnel lens arrays, close-packed lens arrays, a prismatic lens array with random prism height or pitch variation, concave microlens arrays, convex microlens arrays, aspherical lens arrays, spherical lens arrays, brushed grooves, or other surface relief features known in the industry to refract, diffract, scatter or otherwise alter the angle of incident light. In some embodiments, the light collimating region is formed from surface protrusions from the light-scattering domains within the PDALS region.

In a further embodiment, the domains of the NPDALS region are substantially aligned perpendicular to a linear array of light-collimating features. The major scattering plane from the NPDALS region can be in a plane perpendicular or parallel to the major axis of the dispersed domains 206 because the difference in refractive index along with the size and shape of the domains determine the major and minor planes. Thus, the major scattering plane of the NPDALS may be parallel to a linear array of light-collimating features. In this case, a portion of the light from the NPDALS is scattered within the optically coupled regions, such that the angular light distribution of the light incident on the collimating features is different than it would be if the light passed through an air gap before reaching the light collimating features. This is because, with an air gap, total internal reflections of light scattered into large angles causes the light to re-enter the scattering region and pass back through the region, where it is scattered again or absorbed.

FIG. 4 illustrates an embodiment of this invention of a backlight incorporating a polarization-sensitive light homogenizer using a linear array of fluorescent light bulbs 402 and reflectors 403 in a reflective housing 401. In this embodiment, the linear array of bulbs creates a spatially non-uniform incident light flux with "hot-lines" (as opposed to "hot spots" when using point sources) parallel to the y axis. As a result, the luminance uniformity needs to be homogenized along x axis. As illustrated in FIG. 4, the NPDALS region will preferentially scatter light more in the x-z plane than the y-z plane. As a result, the forward scattered light will pass through the birefringent region 202 and into the PDALS region 203; and the component of the light polarized perpendicular to the domains 206 (y direction) will pass through the PDALS region 203 and into the light-collimating region 301 where the light traveling at large angles will be directed back toward the direction normal to the backlight (z direction). In this configuration, the refractive index difference between the second dispersed domains 206 and the matrix material 207 in the y direction is greater than 0.01; and the refractive index difference in the x direction is less than 0.005. As a result, light polarized in the y direction will be reflectively scattered, while light polarized in the x direction will substantially pass through the PDALS region without additional scattering. The light that passes through the PDALS region will either be reflected by a total internal reflection or a Fresnel reflection or be redirected through refraction to angles, with a significant portion of the incident light directed closer to the light homogenizer normal. A significant portion of this redirected light will be directed toward a smaller angle with respect to z axis, and the resulting "head-on" luminance of the backlight will be increased.

By adding a non-polarization-sensitive anisotropic light-scattering region, in the embodiment illustrated in FIG. 4, the light from the linear fluorescent bulbs is efficiently scattered at each pass through the NPDALS. This efficiency is increased more significantly because of the multiple passes of the light through the NPDALS region. The NPDALS also allows for a thinner thickness to be used for the non-polarization-sensitive scattering region, thus decreasing the total thickness of the homogenizer and reducing the costs of production. In addition to the improved optical efficiency, domain materials may be chosen such that the flexural modulus of the region and thus the light homogenizer is increased. This allows for a thinner light homogenizer because of the increased yields during assembly and handling of the homogenizer. Typical diffuser plates are made from PMMA, which has a flexural modulus of 3 GPa. In order to reduce the thickness of the diffuser plate, the diffuser plate must have a higher effective flexural modulus. In one embodiment of this invention, the first dispersed domains may be a material with a significantly higher flexural modulus, such that they increase the effective flexural modulus of the homogenizer. For example, by using a PET matrix material with a 20% concentration of aligned dispersed domains of glass fibers, the flexural modulus can be greater than 4 GPa.

FIG. 5 illustrates a further embodiment of a polarization-sensitive light homogenizer wherein the NPDALS region 501 includes first dispersed domains 505 in a matrix material 504, wherein the domains 505 are substantially aligned in the x direction, such that the major plane of diffusion is in the y-z plane with a minor diffusion plane in the x-z plane. In this embodiment, direct light from the fluorescent bulbs 402 and the light reflected from the reflector 403 and the housing 401 is incident on the NPDALS region 501 such that a there is less scattering in the x-z plane than the y-z plane. The refractive index difference between the second dispersed domains 506 and the matrix material 507 in the x direction is greater than 0.01 and the refractive index difference in the y direction is less than 0.005. As a result, light polarized in the x direction will be reflectively scattered, while light polarized in the y direction will substantially pass through the PDALS region without additional scattering. In this configuration the major scattering plane due to the NPDALS region is in the y-z plane and the collimating features are substantially constant along the y direction and provide refractive collimating re-direction of light in the x-z plane. By aligning the NPDALS scattering plane perpendicular to the collimation plane, the collimating features provide increased head-on luminance due to the angular distribution of the input light.

FIG. 6 illustrates a further embodiment of this invention similar to that of FIG. 5, except that a linear grid array of LEDs illuminates the NPDALS region. The grid array of light sources effectively creates a grid-like pattern of light sources and in this case requires scattering in the y-z and x-z planes to provide sufficient spatial luminance uniformity. In this embodiment, the NPDALS region 501 anisotropically scatters a significant portion of the incident light in the y-z plane; and the light polarized in the x direction will be reflectively scattered anisotropically with the major axis of scattering in the x-z plane from the PDALS region 203. As a result, the light that has passed through the NPDALS region 203 and reflects from the PDALS region 501 has scattered in both planes. This is required because the light source in this example is a grid array and is thus non-uniform spatially (and it's resulting incident flux is non-uniform) in the x and y directions.

By using the NPDALS region 501 and the PDALS region 203, the light is efficiently scattered along the x and y axis such without employing an inefficient symmetric scattering region. Since the recycling of the unwanted polarization requires a reflective (or backscattered) component, anisotropic polarization-sensitive backscattering can be utilized to provide the scattering in the x-z plane (increasing the spatial luminance uniformity by increasing the incident light flux uniformity in the x direction), while the NPDALS region provides the anisotropic scattering along the y-z plane (increasing the spatial luminance uniformity by increasing the incident light flux uniformity in the y direction). This system can provide the necessary and efficient light scattering for providing increased luminance uniformity in a thin and efficient light homogenizer.

Figure 7:
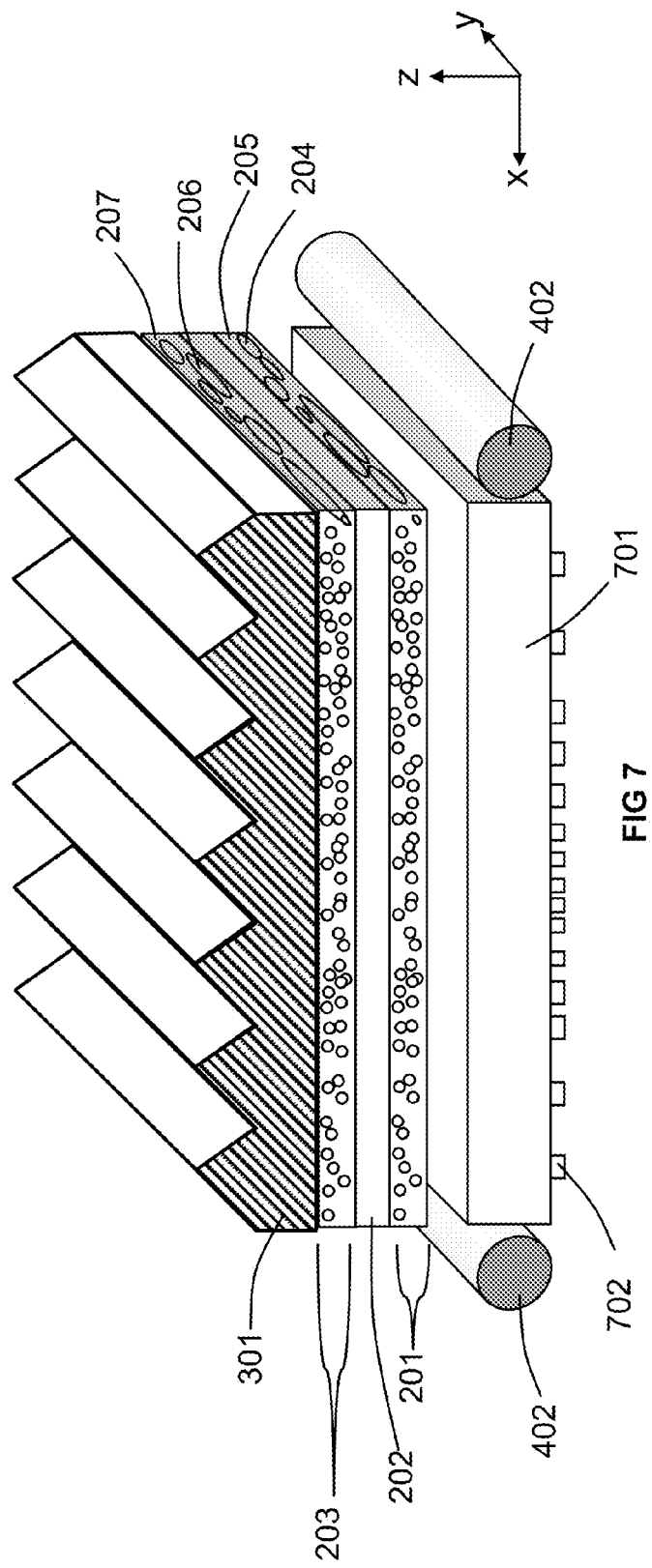
FIG. 7 is a perspective view of one embodiment of an edge-lit backlight including a polarization-sensitive light homogenizer and two linear fluorescent bulbs.

FIG. 7 illustrates an embodiment of a backlight including a polarization-sensitive light homogenizer and an edge-illuminated waveguide. The light from the fluorescent bulbs 402 is coupled through the edge of a substantially transparent waveguide 701. On the bottom surface of the waveguide, light-scattering regions 702 are printed (or embossed or otherwise formed) on the surface such that a portion of the light incident on the region will be redirected through scattering, refraction, reflection or diffraction into angles that will not satisfy the total internal reflection (TIR) condition on the top surface of the waveguide. The regions are typically arranged in a specific pattern with varying pitches and sizes in order to improve the spatial luminance uniformity of the light coupled out of the waveguide.

In this example, the NPDALS region may be designed to substantially scatter more light in the +z direction than the −z direction. In a further embodiment, the forward scattering is substantially symmetric about the +z axis from the angular range, phi=0 to 90 degrees, wherein phi is the angle of the FWHM of the diffusion intensity profile measured from the +z axis. Typically, the amount of diffusion required for the NPDALS region will be less than that required for the direct-lit cold-cathode-fluorescent-lamp (CCFL) backlight in FIG. 5 due to a more uniform incident light flux. In general, the edge-lit backlight geometry allows for thinner backlights; and the polarization-sensitive light homogenizer efficiently controls the scattering, collimation and recycling of the light from the waveguide. Tapered waveguides and one, two, three, or more fluorescent lamps may be used.

In another embodiment of this invention, the light homogenizer includes a substantially non-scattering substrate, a PDALS region, and a NPDALS region wherein light from LED's, fluorescent lamps or other light emitting devices can be directed through an edge of the substrate, and the NPDALS region couples the light out of the waveguide. In some embodiments, the scattering of the NPDALS region is spatially varying. In particular embodiments, the scattering increases from the edge to the center of the light homogenizer such that uniform coupling of the light out of the waveguide can be achieved by one or more light sources or arrays of light sources along one or more edges of the substrate. In a further embodiment of this invention, the light homogenizer includes a PDALS region, and a NPDALS region that is sufficiently thick such that light from LED's, fluorescent lamps or other light emitting devices can be directed through an edge of the NPDALS region such that the domains scatter a portion of the incident light into angles that escape the waveguide and pass through the remaining components of the light homogenizer.

In some embodiments, the refractive index in the x, y, or z direction of the non-scattering region between the NPDALS and the PDALS regions is sufficiently low to support total internal reflection conditions (a waveguide) in the NPDALS region. In particular embodiments, the refractive index of the non-scattering region in the x direction is 1.4 or more preferably less than 1.3. In another embodiment the scattering of the NPDALS region varies within the volume. In additional embodiments, the scattering increases in the x direction from the edge to the center of the light homogenizer such that uniform coupling of the light out of the waveguide can be achieved by one or more light sources or arrays of light sources along one or more edges of the substrate.

Figure 8:
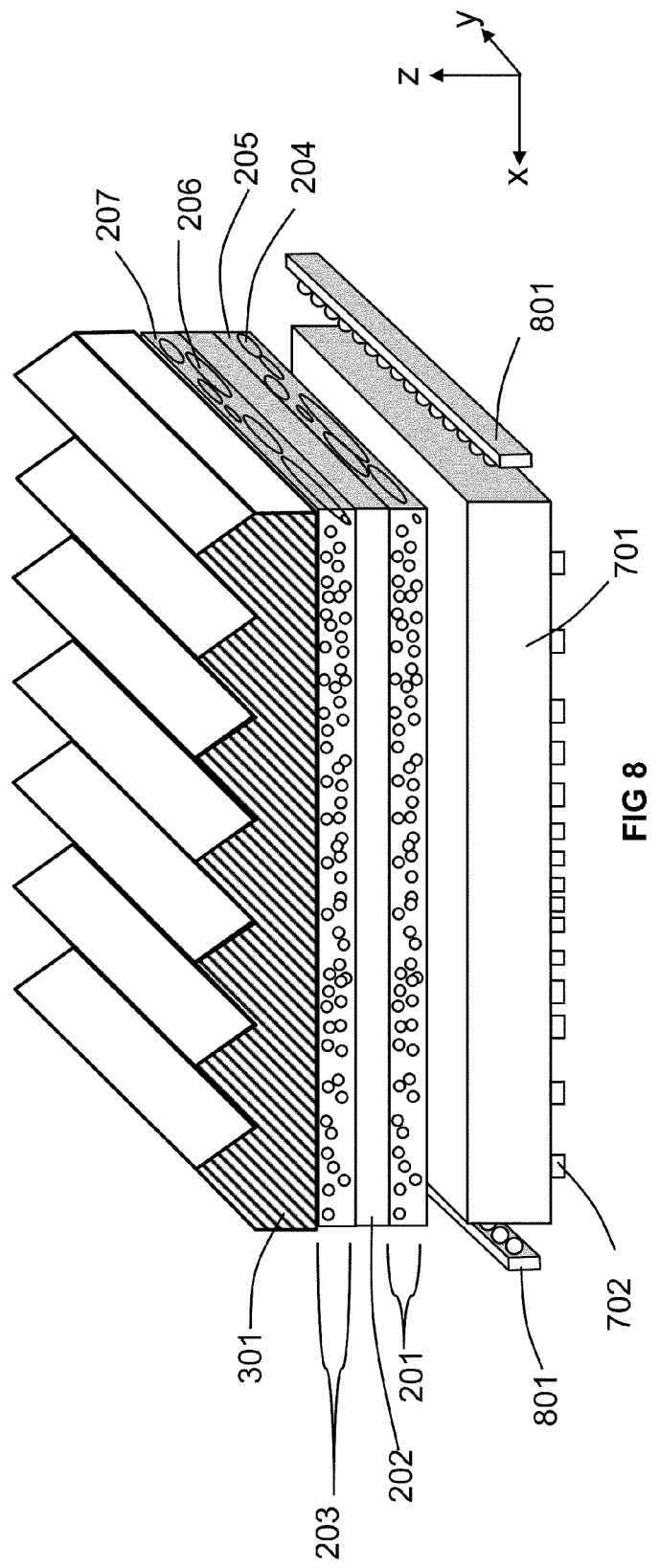
FIG. 8 is a perspective view of one embodiment of an edge-lit backlight including a polarization-sensitive light homogenizer and two linear arrays of LED's.

FIG. 8 illustrates a further embodiment of this invention similar to that illustrated in FIG. 7, except that the light sources are two linear arrays of Light Emitting Diodes. The LED's may be a distribution of red, green and blue LEDs such that the color (white point, color gamut) and luminance uniformity are achieved when used in combination with the polarization-sensitive light homogenizer. Alternatively, the LED array could include one or more broadband LED's, such as a white LED. The input surfaces of the waveguide may also include NPDALS or PDALS in order to scatter the light in the x-y plane such that increased color uniformity can be achieved when more than one color light source is used. In another embodiment, refractive, diffractive, or other scattering surface-relief structures may be incorporated on one or more of the surfaces of the waveguide to increase input coupling, improve color or luminance uniformity, improve output coupling or redirect the light into desired angular range.

The LED's may also have secondary optics to make the output more collimated or to make the output in a desired angular range. In a further embodiment, side-emitting LED's may be used wherein the light is coupled into the waveguide from an edge or hole. The side-emitting LED's may be used in direct- or edge-lit designs. Additional reflectors (specular or diffuse) maybe be used in the housing or on different surfaces of the waveguide or external to the waveguide to reduce light loss and use multiple reflections to improve uniformity. In a further embodiment, a backlight includes a polarization-sensitive light homogenizer; the homogenizer is illuminated from the sides (edge-lit) and from below (direct-lit) with more than one red, green, blue or white light source. Light from the two illumination directions can provide different illumination colors and intensities; and light from the sources may be simultaneous or sequential, may provide increased color gamut, may provide spatial angular or chromatic variations of light output for each of the direct- or edge-lit modes, or may be used in a color sequential mode, field sequential mode, increased luminance or other mode.

Figure 9:
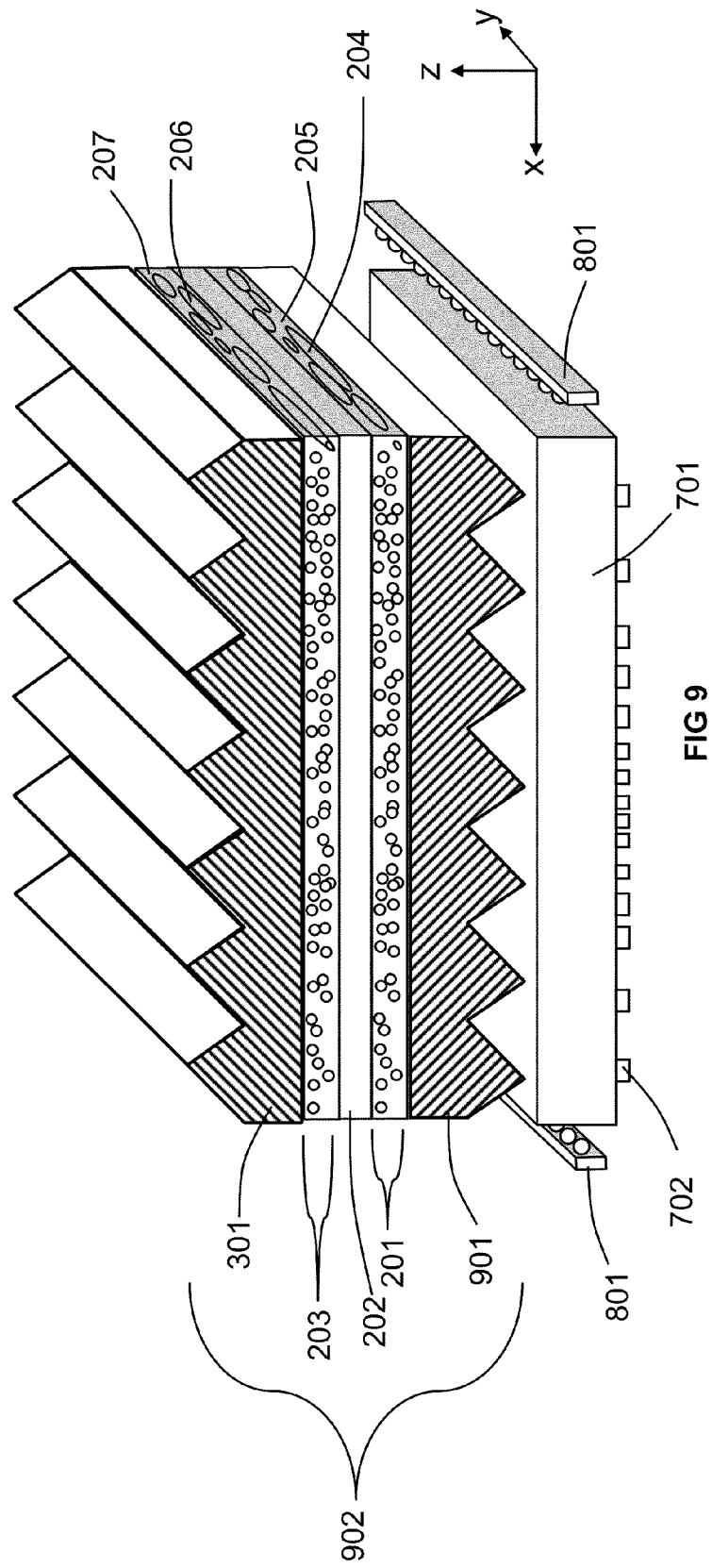
FIG. 9 is a perspective view of one embodiment of an edge-lit backlight including a polarization-sensitive light homogenizer including a light re-directing region and two linear arrays of LED's.

FIG. 9 illustrates a further embodiment of a backlight using a polarization-sensitive light homogenizer 902 including a light collimating region 301 and a light re-directing region 901. The light output from waveguides is typically at steep angle and often a bottom diffuser film is used that contains beads dispersed in a binder on a substrate to create a random surface structure, similar to a microlens array, that re-directs the light toward the normal direction. In other configurations such as the reverse-prism configuration a prism film is used with the apexes of the linear array of prisms facing the output surface of the waveguide. By using a light re-directing region 901 that is optically coupled to the NPDALS region 201, a single film can be used that combines the redirection, diffusion, re-cycling, and polarization recycling features in order to achieve an efficient, high luminance, and uniform (color and luminance) light homogenizer. The light redirecting region 901 redirects a significant portion of the output from the waveguide 701 into angles nearer the +z axis. The light collimating region 301 serves to redirect a substantial portion of the incident light from higher angles toward the direction normal to the substantially planar homogenizer such that when viewed from near the normal direction, the luminance is increased. The light re-directing features 901 may be linear, in the form of a grid, random, semi-random or otherwise ordered or in the form of arrays capable of being represented mathematically of a repeated or varying structures, including angled, curved, regular, or irregular surface features. Examples include a linear array of prisms, a grid array of corner-cube features, microlens arrays, microlenslet arrays, cylindrical lens arrays, Fresnel lens arrays, close-packed lens arrays, prismatic lens array with random prism height or pitch variation, concave microlens arrays, convex microlens arrays, aspherical lens arrays, spherical lens arrays, brushed grooves, or other surface-relief features known in the industry to refract, diffract, scatter or otherwise redirect a portion of incident light to a new angle. In the example of the embodiment of a backlight shown in FIG. 9, the polarization-sensitive light homogenizer 902 is used with an edge-lit LED array 801 and a waveguide 701 with light-scattering regions 702. In a further embodiment, the light re-directing region is a surface profile formed from surface protrusions caused by the domains in the NPDALS region.

Figure 10:
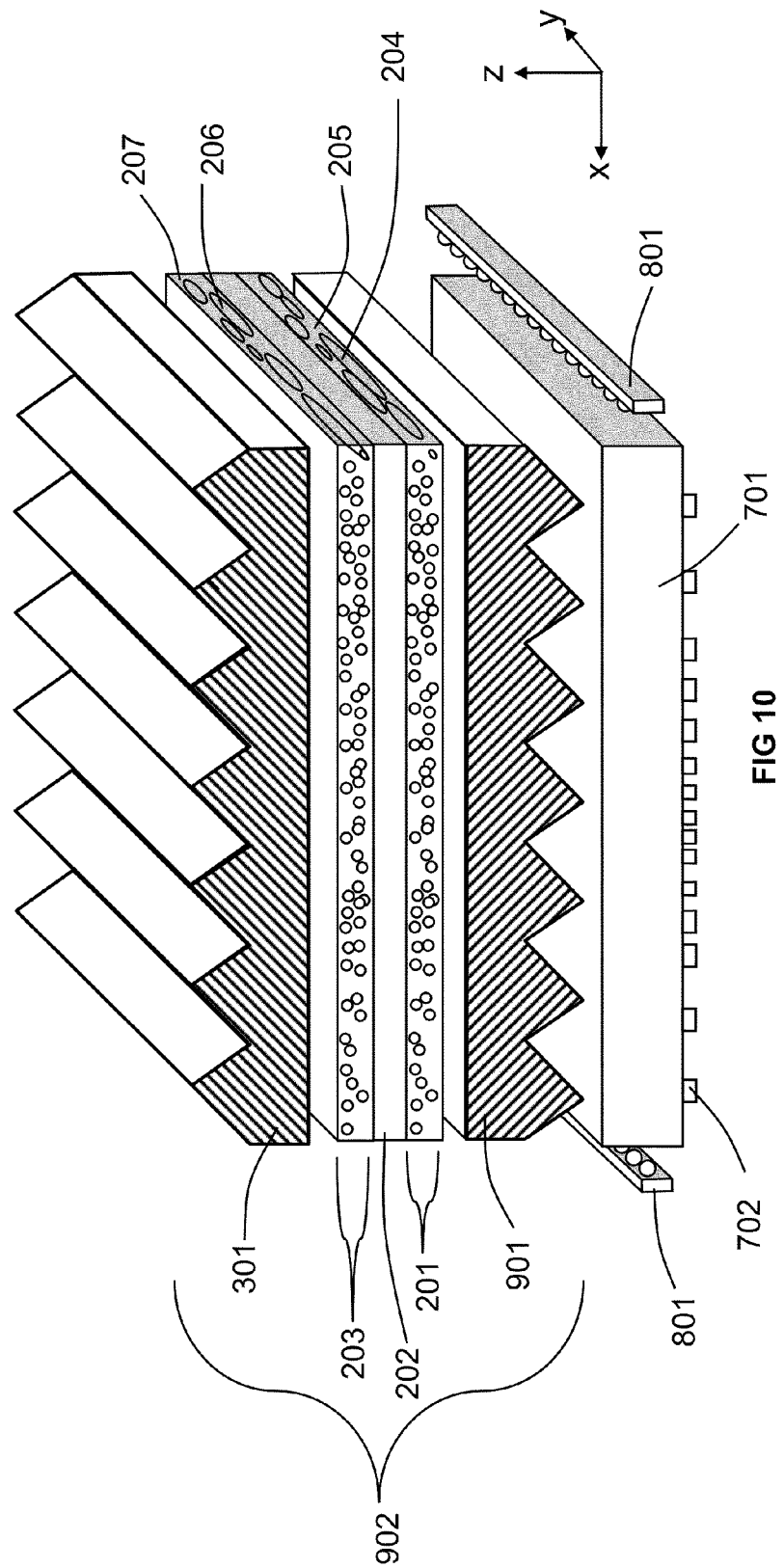
FIG. 10 is a perspective view of one embodiment of an edge-lit backlight including a polarization-sensitive light homogenizer including a light re-directing region and a light collimating region spaced from the NPDALS region and PDALS region, respectively, by an air gap and further including two linear arrays of LED's.

FIG. 10 illustrates a further embodiment of a backlight using a polarization-sensitive light homogenizer 902 including a light-collimating region 301 and a light re-directing region 901. In this embodiment one or more of the regions are separated by an air gap. As shown, the light-collimating region 301 is separated from the PDALS region by an air gap and the NPDALS region is separated from the waveguide 701 by an air gap. In this embodiment, the profile of light (angular intensity pattern) reflecting or transmitting from the PDALS and the NPDALS will be different due to the total internal reflections encountered at the matrix-air interfaces. Other regions including one or more of the light-collimating region, PDALS region, birefringent region, NPDALS region, or light-redirecting region may be separated from a neighboring region by an air gap.

Figure 11:
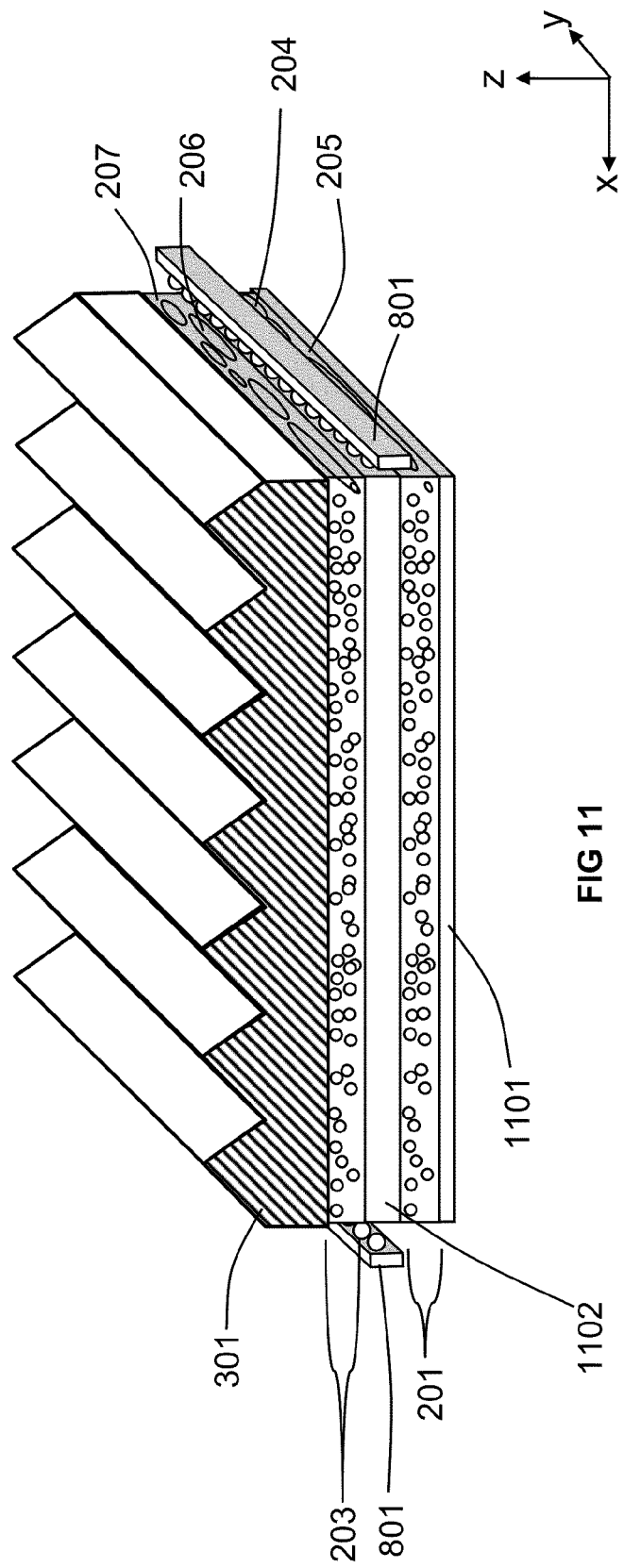
FIG. 11 is a perspective view of one embodiment of an edge-lit backlight including a polarization-sensitive light homogenizer wherein light from two linear arrays of LED's is directed into the edge of the non-scattering region of the light homogenizer.

FIG. 11 illustrates a further embodiment of a backlight using a polarization-sensitive light homogenizer, wherein the substantially non-scattering region 1102 between the NPDALS region 201 and the PDALS region 203 forms a cavity through which light scattered back and forth from the NPDALS region 201 and PDALS region 203 passes. In this embodiment, the light from the LED array 801 can be directed into the non-scattering region 1102 formed between the two anisotropic light-scattering regions such that it behaves as a waveguide. In one embodiment, the non-scattering region 1102 functions as a waveguide cavity for the substantially non-scattered incident light from the LED array 801. In another embodiment, the non-scattering region 1102 functions as a waveguide cavity for scattered light between the NPDALS region 201 and the PDALS region 203. In a further embodiment, the substantially non-scattering region 1102 functions as a waveguide cavity for the substantially non-scattered light from the LED array 801 and the scattered light from the NPDALS region 201 and the PDALS region 203. This substantially non-scattering region 1102 may be birefringent or substantially non-birefringent. In cases where it is desirable to modify (rotate or de-polarize) the polarization state of light so that it may efficiently pass through the PDALS region 203, the modification may be achieved within the PDALS region 203, the NPDALS region 201 or in the substantially non-scattering region 1102. In one embodiment, the PDALS region 203 and NPDALS region 201 are designed for optimum scattering efficiency and the substantially non-scattering region 1102 modifies the polarization state (as in the case of a birefringent region). In another embodiment, the PDALS region 203 or the NDPDALS region 201 provide the modification of the polarization state that provides increased light output of light of the desired polarization state. Thus, the PDALS region 203 or the NDPDALS region 201 can provide optimum scattering efficiency as well as controlled polarization modification to increase the light output. The polarization modification may be designed to occur in the NPDALS region 201, the PDALS region 203, or the waveguide region 1102.

In one embodiment, the substantially non-scattering region 1102 has a polarization retardation, $\sigma$, wherein $\sigma>0$. In a further embodiment, the substantially non-scattering region 1102 has a substantially quarter wave polarization rotation such that $\sigma=137.5$ nm (quarter-wave for visible light centered at 550 nm) for s-polarized light. In another embodiment, the substantially non-scattering region 1102 has a polarization retardation such that $100<\sigma<175$. In a further embodiment, the substantially non-scattering region 1102 has a polarization retardation such that $50<\sigma<300$. In another embodiment, the substantially non-scattering region 1102 has effectively a full-wave polarization retardation such that $525<\sigma<575$.

In one embodiment, the substantially PDALS region 203 has a polarization retardation, $\sigma$, wherein $\sigma>0$. In a further embodiment, the PDALS region 203 has a substantially quarter wave polarization rotation such that $\sigma=137.5$ nm (quarter-wave for visible light centered at 550 nm) for s-polarized light. In another embodiment, the PDALS region 203 has a polarization retardation such that $100<\sigma<175$. In a further embodiment, the PDALS region 203 has a polarization retardation such that $50<\sigma<300$. In another embodiment, the PDALS region 203 has effectively a full-wave polarization retardation such that $525<\sigma<575$.

In one embodiment, the substantially NPDALS region 201 has a polarization retardation, $\sigma$, wherein $\sigma>0$. In a further embodiment, the NPDALS region 201 has a substantially quarter wave polarization rotation such that $\sigma=137.5$ nm (quarter-wave for visible light centered at 550 nm) for s-polarized light. In another embodiment, the NPDALS region 201 has a polarization retardation such that $100<\sigma<175$. In a further embodiment, the NPDALS region 201 has a polarization retardation such that $50<\sigma<300$. In another embodiment, the NPDALS region 201 has effectively a full-wave polarization retardation such that $525<\sigma<575$.

A reflective film 1101 may be used beneath the NPDALS region to re-direct light traveling in the $-z$ direction to the $+z$ direction. The orientation of the major and minor diffusion axes in one or more of the NPDALS or PDALS regions may be orthogonal, parallel, or at an angle with respect to each other or an edge of the light homogenizer. In a further embodiment, light is coupled into the edge of at least one of the light-collimating region, a light re-directing region, NPDALS, PDALS or non-scattering region.

It is known that backwards reflections from domains can be reduced by using a core-shell geometry for a domain. This geometry also affects the forward-scattering light profile. Details and methods for obtaining the desired core-shell properties and materials are disclosed in US Patent Application Publication Number 2004/0263965, incorporated in its entirety herein as a reference. However, by using a domain of a material that is anisotropic (a material such that physical properties vary along two or more directions), such as a domain of birefringent PET one can control the backwards (and thus forward) scattering properties including efficiency for one or more polarization states. For example, one may use a birefringent domain and a coating of a material of a prescribed thickness and substantially isotropic refractive index that matches one of the refractive indexes of the domain in the x, y, or z direction. This domain and coating (or shell-like material) may be dispersed in a matrix material that is non-birefringent, birefringent, tri-refringent, isotropic, or anisotropic in order to achieve efficient polarization-sensitive forward or backward scattering anisotropic properties.

In some embodiments, a polarization-sensitive light homogenizer includes a polarization-dependant light-scattering region containing domains that are coated with a refractive index such that the thickness and refractive index of the coating along with the domain and matrix creates a destructively interfering backwards reflection that improves the forward-transmission properties of light polarized in at least one polarization state. In one embodiment, birefringent stretched fibers are coated with a specific refractive index and thickness coating that reduces the reflection in one polarization state such that the transmission of light of that state is increased over that known in the prior art. The refractive index and thickness can be chosen to optimize the forward scattering for one polarization state, optimize the backwards scattering for one polarization state, or to achieve other designed scattering distributions. In one embodiment, the thickness of the skin layer satisfies the following requirement:

$$T_x = \sqrt{R_x^2 + \left(\frac{2n+1}{4}\psi\right)^2 + \frac{\sqrt{2}}{4}(2n+1)} - R_x,$$

where $T_x$ is the thickness of the coating in the x direction in microns, $R_x$ is the average thickness (or radius) of the domain in the x direction in microns, n is an integer not less than 0, and $\psi$ is the wavelength of interest (e.g., 380 nm to 780 nm, or, more particularly, 400 nm to 700 nm). In some embodiments, the thickness of the coating is approximately lamda/4, and the refractive index of the coatings is such that one of the following conditions applies:

$n_{cx} = \sqrt{n_{dx} n_{mx}},$ $n_{cy} = \sqrt{n_{dy} n_{my}},$ $n_{cz} = \sqrt{n_{dz} n_{mz}}$ In the above equations, $n_{cx}$, $n_{cy}$, $n_{cz}$, $n_{dx}$, $n_{dy}$, $n_{dz}$, and $n_{mx}$, $n_{my}$, $n_{mz}$ are the refractive indexes in of the coating, domains, and matrix materials in the x, y, and z directions, respectively. In some embodiments, the wavelengths are centered in the visible range and the thickness is approximately 138 nanometers.

Materials other than coatings may be used to achieve a core-shell morphology for directing more or less light forward, backwards, or into the major or minor diffusion planes. Particular approaches include adding to the matrix material a third encapsulating phase, a block copolymer, or other materials miscible or immiscible with the matrix material. In some embodiments, the shell material increases the dispersion of the domains within the matrix during production while providing a destructive interference (anti-reflection) effect. In another embodiment, the coating or shell material is birefringent and the domain is substantially non-birefringent. In another embodiment, at least one of the matrix, shell or domain materials is birefringent. Other materials, such as block co-polymers may be used to create refractive index gradients between two of the phases of the material. This could create GRIN (graded refractive index) structures with reduced backscatter.

In some embodiments, a polarization-sensitive light homogenizer includes a NPDALS region and a PDALS region wherein at least one of the domains from one of the regions has a core-shell relationship such that the forward, backward, major-diffusion-plane, and minor-diffusion-plane scattering is improved for at least one polarization state.

Methods of manufacturing the NPDALS or PDALS region include blending, extruding, and stretching a blend of different materials as disclosed in U.S. Pat. Nos. 5,825,543 and 5,751,388 and published US Patent Application 2006/0056166, wherein the full contents of each are incorporated herein by reference.

In some embodiments, the polarization-sensitive light homogenizer is used with a light source that emits substantially more light in a first polarization state than in a second polarization state. In some embodiments, the polarization-sensitive light homogenizer is used with a polarized light emitting diode.

One embodiment of this invention is a light homogenizer that efficiently couples light into the homogenizer and increases the spatial luminance uniformity and/or the spatial color uniformity from one or more light sources while preferentially transmitting light of one or more polarization states and increasing the luminance in a pre-determined direction. One embodiment of this invention includes the use of a light homogenizer within a backlight and its use illuminating a spatial light modulator (SLM) such as an LCD. This invention also includes the method of manufacture of a polarization-sensitive light homogenizer. One embodiment of this invention includes first dispersed domains within a first matrix that can preferentially reflect light of one polarization state while transmitting light of another polarization state and second dispersed domains in a second matrix that scatter light substantially without regard to its polarization state. For example, the first domains may be substantially isotropic glass fibers dispersed in a first matrix of birefringent PET. Other examples include those discussed in U.S. Pat. No. 5,825,543. The second dispersed domains may be cross-linked PMMA microspheres within a second matrix of amorphous PETG. The second dispersed domains may scatter light isotropically or anisotropically.

The first and second domains may be within the same regions and one or more may be co-continuous with respect to each other. The first, second, or both of the dispersed domains may contribute to light collimation by causing protrusions within the surface under certain processing conditions. Regular, random, or semi-random light collimating features may be created on the surface using embossing, stretching or other techniques known to give surface relief, such as thermal embossing, ablation, or embossing using UV curing lacquers. The light homogenizer can be used with fluorescent light sources, such as a linear array of cold-cathode fluorescent bulbs or arrays of LED's or lightguides incorporating total internal reflections. The light homogenizer is disposed to receive light from one or more of the light sources and transmit light to the SLM.

The light homogenizer can be made by extrusion processes such as calendaring or casting and may include processes such as stretching in the machine direction (the direction of movement of the film in a web process), stretching in the transverse direction (the direction across the web that is perpendicular to the machine direction), embossing, curing, exposing to specific electromagnetic radiation, and annealing in order to achieve the desired optical properties. An efficient light homogenizer can be made by controlling the shape, refractive index of the dispersed and continuous phases and by selecting the thermal, mechanical, and optical properties of the materials and components. This can efficiently control the forward and backward scattering and polarization-sensitive scattering. The angular acceptance of light and angular redirection of light will increase the luminance in a desired direction, and controlled anisotropic scattering for increased system efficiency can be achieved.

In a further embodiment, the light homogenizer is sufficiently thick to provide support and sufficient diffusion properties such as to replace the diffuser plate often used in LCD backlights, signs or other displays or illumination devices. In a further embodiment of this invention, a region of the light homogenizer provides a light guide that sufficiently allows for the light to spread laterally in the x and or y directions while increasing the luminance and/or color uniformity and increasing the luminance in a pre-determined direction.

In one embodiment of this invention, one or more of the light-scattering regions in the light homogenizer is manufactured by cast film extrusion of a material containing a blend of two or three immiscible materials such that when the film is stretched, the first dispersed material has a refractive index that differs from that of the first continuous-phase material by more than 0.01 in the x direction and by less than 0.05 in the y direction. The second dispersed phase material has a refractive index that differs from that of the first or second continuous-phase region by more than 0.01 in the x and y directions. In another embodiment of this invention, one or more of the scattering regions of the light homogenizer is manufactured by cast film extrusion of a material containing at least two layers, wherein, after orientation or stretching, a first layer contains an immiscible blend of two materials such that a first dispersed-phase material has a refractive index that differs from that of the first-layer continuous-phase material by more than 0.01 in the x direction and by less than 0.1 in the y direction. The second layer contains a second dispersed-phase material with a refractive index that differs from that of the second continuous-phase material by more than 0.01 in at least one of the x, y, and z directions.

In a further embodiment of this invention, the light homogenizer is manufactured via a process similar to one of the aforementioned descriptions, with the additional creation of surface relief features on the light-source side of the light homogenizer, the SLM side of the light homogenizer, or both. These features may aid in coupling light into the light homogenizer, collimating the light, increasing the luminance uniformity, increasing the color uniformity or a combination thereof.

In a further embodiment of this invention, the light homogenizer is manufactured via a process similar to one of the aforementioned descriptions, wherein the machine and transverse-direction orientations are performed at temperatures above and below the glass-transition temperature of one or more of the dispersed domains. In one embodiment, the film is cast; and the film is stretched in the machine direction at a temperature above the glass transition temperature of a first and second dispersed-phase material, such that elongated first and second dispersed domains are created. In a subsequent step, transverse-direction stretching is performed at a temperature above the glass transition temperature of the second elongated dispersed domains and below the glass-transition temperature of the first elongated dispersed domains. By choosing the materials such that the first elongated dispersed domains have a refractive index that differs from that of the encapsulating continuous phase by more than 0.01 in the x and y directions, the first elongated dispersed domains will anisotropically scatter light in the forward direction. As a result of the transverse-direction orientation of the second elongated dispersed domains, plate-like dispersed domains are created. By choosing the materials such that the plate-like domains have a refractive index that differs from that of the encapsulating continuous phase by than 0.01 in one of the x or y directions and less than 0.005 in the other direction, the plate-like domains will selectively backscatter light of a pre-determined polarization orientation.

In another embodiment of this invention, the orientation in the transverse direction, machine direction or both causes one or more of the dispersed domains to cause surface protrusions. These protrusions can increase at least one of the light collimation properties, the light re-direction properties, the luminance uniformity, or the color uniformity. In one embodiment, the viscosity of the dispersed-phase material is significantly higher than that of the encapsulating continuous phase at the orientation temperature, such that the continuous phase material substantially flows around the disperse domain. This can occur when the glass-transition temperature of the dispersed domain is higher than that of the glass-transition temperature of the continuous phase material and when the orientation is step is performed at a temperature higher than the glass-transition temperature of the continuous-phase material and lower than the glass-transition temperature of the dispersed phase material.

In a further embodiment, the refractive index difference between the dispersed domains causing the protrusions and the encapsulating continuous phase is less than 0.1 in at least one of the x, y, or z directions. In some embodiments, this refractive difference is less than 0.005 in the x, y, and z directions such that very little additional scattering is attributed to the volume region of light homogenizer due to the interface between these dispersed phases and the continuous phase. In one or more of the aforementioned embodiments, the protrusions can be designed to contribute to at least one of the properties of: increased luminance in a predetermined direction, increased spatial luminance uniformity, increased spatial color uniformity, increased polarization recycling efficiency, increased efficiency due to polarization-sensitive anisotropic scattering, increased efficiency due to non-polarization-sensitive anisotropic scattering. In a further embodiment of this invention, the first dispersed domain preferentially scatters light of a pre-determined polarization state in the −z direction and the processing conditions such as the ones described above for creating protrusions cause gaseous phase domains or voids that scatter light in the +z direction without significant discrimination to a particular polarization state.

In a further embodiment, the substantially non-scattering region optically rotates a polarization state of light and includes birefringent or tri-refringent material disposed between the polarization-sensitive scattering region and the light source such that increased recycling efficiency can be achieved through designed optical rotation of the light, such that more light is rotated by one half wave through two passes of the birefringent or tri-refringent material. In one embodiment, the optical-rotation region rotates 550 nm incident light by approximately a quarter wave in one pass. In one embodiment, the optical rotation region is created by the orientation process, as discussed in previous embodiments. In some embodiments, the rotation covers the visible spectrum of light.

In a further embodiment of this invention, a backlight with increased luminance and reduced cost and film count can be achieved by using a NPDALS region in combination with a multi-layer stack of alternating polymeric regions with a refractive index difference in the x direction of less than 0.1, and a refractive index difference in the y direction greater than 0.01 at each layer interface. These reflective polarizers can be created through extrusion using feedblocks with large numbers of layers and multiplers, as described in U.S. Pat. Nos. 5,486,949 and 5,825,542. By using more than one dispersed domain in combination with the multi-layer stack of alternating polymeric regions and processing such that the multi-layer stack portion of the extruded film layers increases the recycling efficiency and such that the dispersed domains in a continuous phase anisotropically scatter the light, a more efficient light homogenizer is created. The scattering properties (forward and backwards) and the surface features described in other embodiments of this invention as well as variations of the aforementioned patents included herein as references may also be incorporated.

In a further embodiment of this invention, red, green and blue LED's are arranged spatially in an array in a backlight; and the light homogenizer spatially distributes the colors individually such that more-uniform color and luminance can be achieved. Individual tri-color LED's may also be used, and other colors representing different color gamuts may be employed. In a further embodiment, the spatial color uniformity is improved by designing the film such that dispersed domain size is sufficiently small to enable the shorter wavelength (blues, or blue-green) to further spread out. This is advantageous due to the fact that fewer blue LED's are typically needed to make the required color spectrum. As a result, the blue LED's are often spaced further apart, thus they need more diffusion to spread out the color over larger spatial ranges. In some embodiments, one or more of the dispersed domains are greater than 0.5 µm and less than 20 µm in at least one of the x, y, and z directions.

In one embodiment of this invention, a polarization-sensitive light homogenizer is a single element that provides increased luminance and/or color uniformity as well as increased luminance in a pre-determined direction using a simple manufacturing process that does not require lamination or adhesives and can be manufactured and assembled into an illumination device at a reduced cost. The increased luminance can be the result of light-collimating surface features, polarization re-cycling, or increased forward scattering and scattering efficiency by using anisotropic forward-scattering dispersed domains. In one embodiment, the manufacturing process is designed to increase the polarization recycling efficiency while simultaneously increasing the uniformity. In another embodiment, the polarization recycling efficiency and luminance uniformity of an optical element are increased in a first step of the process, (stretching after casting for example); and in a second step, the properties of one set of dispersed domains are "locked in" by reducing the viscosity of the dispersed domain (such as by decreasing the temperature) or cross-linking the material (by heat, UV radiation, etc.). In a later step of the embodiment, the material is further stretched such that a second set of dispersed domains stretch in a direction orthogonal to the first stretching to achieve anisotropic scattering along an axis orthogonal to the first. In one embodiment, the first domains anisotropically scatter incident light depending on the polarization state and the second domains scatter the light substantially independent of the polarization state of the incident light. By combining the polarization scattering and the non-polarization-sensitive scattering within the same region, a reduced thickness film can be obtained.

Additives can be used within one or more of the dispersed or continuous phases. These can be additives such as those commonly used to increase surface conductivity or UV absorption, provide anti-blocking, etc. The increased luminance can be designed to be in the +z direction, at an angle theta to the +z direction, or over a range of angles from the +z direction (symmetric or non-symmetric about the axis). In one embodiment, one or more of the dispersed domains contains birefringent materials. In another embodiment, the dispersed domains contain birefringent or tri-refringent materials such that the refractive index difference between the dispersed-phase material and the continuous-phase material in at least one of the x, y, or z direction is less than 0.1 (preferably less than 0.05, and more preferably less than 0.01). In another embodiment, the refractive index difference of the material of the dispersed domain in at least one of the x, y, or z directions is less than 0.1 (preferably less than 0.05, and more preferably less than 0.01). The first, second, or both dispersed domains may also be substantially spherical or ellipsoidal. Both or one of the dispersed phases can be stretched in the machine direction to produce elongated domains in the machine direction that could be stretched to produce less elongated domains in one or more directions. One or more of the dispersed domains can enhance the anti-blocking features of the material by contributing to surface roughness, protrusions, or reduced gloss levels.

In one embodiment of this invention, one or more of the regions has an increased flexural modulus in one direction due to the contribution of the asymmetric domains. In one embodiment of this invention, the dispersed domains may also be a material with a significantly higher flexural modulus, such that they increase the effective flexural modulus of the light homogenizer. By using a PET material with a 20% concentration of dispersed domains of glass fibers, the flexural modulus can be greater than 4 GPa. In one embodiment, the refractive index difference between the dispersed domains and the matrix material provide anisotropic diffusion (polarization-sensitive or non-polarization-sensitive), while also providing increased effective flexural modulus. In another embodiment, the light homogenizer includes more than one region of dispersed domains, wherein the first region isotropically or anisotropically scatters incident light, and the refractive index of the second region of dispersed domains substantially equals the refractive index of the matrix and the dispersed domains are made of a material with a higher flexural modulus that substantially increases the effective flexural modulus.

One or more of the light-collimating, light-redirecting, NPDALS, PDALS, or substantially non-scattering regions may be optically coupled or separated by an air gap from a neighboring region or have surface relief features to prevent wet-out and/or to provide collimation.

In one embodiment of this invention, the scattering properties of at least one of the NPDALS and PDALS regions vary spatially. Typically, the scattering regions are substantially spatially uniform in films and in components used with backlights and displays in order to increase the spatial luminance uniformity. However, in the case where the light source or light sources vary spatially in intensity and where the scattering region is located in close proximity to the light source, the "hot spot" or higher intensity region corresponding to a region with larger incident flux illumination will need a higher degree of scattering than a region receiving a lower incident flux illumination. In a polarization light homogenizer with spatially varying scattering properties, typically measured by examining the spatial variance of the FWHM diffusion profile, the scattering is higher in regions receiving a higher incident flux relative to regions receiving a lower incident flux illumination. As a result, the larger flux incident on the region with higher scattering properties will scatter a larger percentage of the flux to higher angles than the region with less scattering. Typically in most systems where even minor light absorption does occur and where light can be lost into steep angles and by waveguiding at surfaces, the spatial luminance of incident light will be decreased when the scattering is increased. In order for the system to have increased spatial luminance uniformity, it is more desirable to have higher scattering in the regions receiving a higher incident light flux and less or even no scattering in the regions receiving less incident flux. By scattering less in the regions with lower incident flux, the spatial luminance in that region is reduced less. In other words, a more-efficient approach is to reduce the spatial luminance in the regions where it is high and allow the regions of low incident flux to pass through the region with less scattering. By re-distributing the light angularly in the higher-scattering regions (that correspond to higher incident flux), the incident light flux reaching the next scattering or light-redirection surface will be more uniform spatially. In one embodiment, a polarization-sensitive light homogenizer similar to that illustrated in FIG. 2, the concentration of the dispersed domains 204 varies spatially with a higher concentration in the regions in close proximity to a high incident flux, such as the region near a linear fluorescent bulb. Thus, the higher incident-light flux is scattered in this region to higher angles, such that upon reaching the PDALS region or another light-scattering region, such as an additional diffuser film or a display surface, the light has a more-uniform illumination flux and therefore a higher spatial-luminance uniformity upon passing through the surface.

The incident flux typically includes light of more than one polarization state; and, therefore, the level of the scattering required in the PDALS or NPDALS region may vary spatially, producing more efficient light throughput.

One or more of the regions may contain a substantially transparent capping region to provide improved mechanical, thermal, optical or other properties. Capping regions also allow improved handling capabilities and can provide higher surface gloss (flatter surface or lower surface roughness) such that the surface may be coated or laminated with higher quality and improved thickness uniformity. The capping layer may contain light-absorbing materials to enhance the light stability of one or more regions of the light homogenizer. The capping layer may also contain anti-static components, hardcoats, anti-blocking features, or other components known to provide optical, thermal, environmental, electrical, physical or other benefits to films and diffuser plates.

In one embodiment of this invention, one or more of the outer surface regions of the light homogenizer includes a coating including protruding domains. By adjusting the domain concentration and size along with the coating thickness, the domains can form protruding hemispherical lenses. The coating continuous phase or the dispersed domains may be made of a composition that provides increased benefits, such as anti-blocking or anti-static properties, hardcoat, reduced or increased scratch resistance to facilitate compatibility with the hardness of the next layer in the backlight system, light resistance, increased thermal expansion or other properties known to improve the performance of an optical component such as those used in backlights.

In one embodiment of this invention, the light homogenizer includes a hard coating layer on one or more outer surfaces. A hard coating layer is typically applied to increase the pencil hardness, to protect the film from damage to other components, to protect other components from damaging the surface-relief profile, or combinations thereof. The coating may be chosen to increase or decrease the surface hardness or scratch resistance. The coating 46 may include other additives or features to provide anti-static, light collimating properties, anti-blocking, UV or light absorption properties, anti-wetting or other properties, such as are known in the optical films and backlight industries.

In one embodiment of this invention, the light homogenizer includes an anti-static additive in one or more regions to reduce dust collection and static buildup during production. The additive may be added to one of the material regions or may be an additional coating that may include other additives to provide desired scratch resistance or pencil hardness, anti-blocking, UV or light absorption properties, anti-wetting or other properties such as are known in the optical films and backlight industries.

The relative orientation of the light sources, the array of light sources, the domains of the light-scattering regions and the light-collimating regions or light-redirecting regions may be perpendicular, parallel or at an angle gamma with respect to each other. For example, the linear array of prisms used as a collimating region may be aligned in the x direction (orthogonal to the array of fluorescent bulbs that are aligned in the y direction) and the non-spherical domains in the NPDALS region may be aligned in the y direction. In some embodiments, the linear array of prisms is aligned in the y direction (parallel to the array of fluorescent bulbs that are aligned in the y direction), and the non-spherical domains are aligned in the y direction. In another configuration of this invention, the shape or concentration of the asymmetric domains in one or more of the light-scattering regions varies spatially.

The transmissive light re-directing region and the light collimating region may include refractive structures, reflective structures, diffractive structures, scattering structures or some combination thereof. Additional optical films maybe used with the polarization-sensitive light homogenizer to achieve a higher brightness or level of uniformity or a particular light output profile in a backlight. Examples of such films include prismatic films, diffuser films (isotropic or anisotropic) and reflective polarizers, tilting films, louver films, and others known in the optical film industry.

In some embodiments of a backlight including a polarization-sensitive light homogenizer, the light directed from one or more sources is substantially collimated. In another embodiment, the color gamut of a display incorporating the backlight is greater than 90% of the NTSC standard. In another embodiment, the dark room contrast ratio of a liquid crystal display utilizing the backlight including a polarization-sensitive light homogenizer of this invention display is greater than 300:1 when measured at a center point.

In another embodiment of this invention, the NPDALS region includes more than one anisotropic scattering region. In a further embodiment, the NPDALS includes two weaker anisotropic regions (smaller full-width at half maximum cross sections when illuminated with collimated light) instead of using one stronger anisotropic scattering region, and the scattering from the first region re-distributes the non-uniform incident flux distribution to a more-uniform flux distribution for the second light-scattering region, such that the total luminance is more uniform along at least one direction. In a further embodiment, the PDALS region includes more than one PDALS region.

Anisotropic Light-Scattering Regions

The polarization-sensitive light homogenizer may include more than one anisotropic light-scattering region or layers. One or more of the diffusing (scattering) regions may have an asymmetric diffusion profile. The light homogenizer may contain volumetric and surface-relief-based diffusive regions that may be asymmetric or symmetric. The diffusing layers may be optically coupled or separated by another material or an air gap. In some embodiments, a rigid, substantially transparent material separates two diffusing regions. In some embodiments, the asymmetrically diffusive regions are aligned such that the luminance uniformity of a backlight is improved. In another embodiment, the spatial luminance profile of a backlight using a linear or grid array of light sources is made substantially uniform through the use of one or more asymmetrically diffusing regions.

The amount of diffusion in the x-z and y-z planes for the NPDALS or PDALS regions affects the luminance uniformity and the potential viewing angle of the backlight and display. By increasing the amount of diffusion in one plane preferentially over that in the other plane, the viewing angle is asymmetrically increased. For example, with more diffusion in the x-z plane than the y-z plane, the viewing angle of the display (related to the luminance and display contrast) can be increased in the x direction. The diffusion asymmetry introduced through one or more of the anisotropic light-scattering regions of the light homogenizer can allow for greater control over the viewing angle and angular intensity profile of the display and the optical efficiency of the backlight and display system. In another embodiment, amount of diffusion (measured as FWHM of the angular intensity profile) varies in the plane of the diffusing layer. In another embodiment, the amount of diffusion varies in the plane perpendicular to the plane of the layer (z direction). In some embodiments, the amount of diffusion is higher in the regions in close proximity of one or more of the light sources.

Alignment of Diffusing Axis in Light Homogenizer

The alignment of the major axis of diffusion in one or more of the anisotropic light-scattering regions may be aligned parallel, perpendicular or at an angle theta with respect to a light source or edge of the backlight. In some embodiments, the axis of stronger diffusion is aligned perpendicular to the length of a linear light source in a backlight.

Domain Shape

The domains within one or more diffuser layers may be fibrous, spheroidal, cylindrical, spherical, other non-symmetric shape, or a combination of one or more of these shapes. The shape of the domains may be engineered such that substantially more diffusion occurs in the x-z plane than that in the y-z plane. The shape of the domains or domains may vary spatially along one or more of the x, y, or z directions. The variation may be regular, semi-random, or random.

Domain Alignment

The domains within a diffusing layer may be aligned at an angle normal, parallel, or an angle theta with respect to an edge of the diffusing layer or a linear light source or array of light sources. In some embodiments, the domains in a diffusing region are substantially aligned along one axis that is parallel to a linear array of light sources.

Domain Location

The domains may be contained within the volume of a continuous-phase material or they may be protruding (or directly beneath a partially conformable protrusion) from the surface of the continuous-phase material.

Domain Concentration

The domains described herein in one or more light-diffusing layers may be in a low or high concentration. When the diffusion layer is thick, a lower concentration of domains is needed. When the light-diffusing layer is thin, a higher concentration of domains or a greater difference in refractive index is needed for a high amount of scattering. The concentration of the dispersed domains may be from less than 1% by weight to 50% by weight. In certain conditions, a concentration of domains higher than 50% by volume may be achieved by careful selection of materials and manufacturing techniques. A higher concentration permits a thinner diffusive layer and as a result, a thinner backlight and display. The concentration may also vary spatially along one or more of the x, y, or z directions. The variation may be regular, semi-random, or random.

Index of Refraction

The difference in refractive index between the domains and the matrix in one or more of the NPDALS, PDALS or other diffusing regions may be very small or large in one or more of the x, y, or z directions. If the refractive index difference is small, then a higher concentration of domains may be required to achieve sufficient diffusion in one or more directions. If the refractive index difference is large, then fewer domains (lower concentration) are typically required to achieve sufficient diffusion and luminance uniformity. The difference in refractive index between the domains and the matrix may be zero or larger than zero in one or more of the x, y, or z directions.

The refractive index of the individual polymeric domains is one factor that contributes to the degree of light scattering by the film. Combinations of low- and high-refractive-index materials result in larger diffusion angles. In cases where birefringent materials are used, the refractive indexes in the x, y, and z directions can each affect the amount of diffusion or reflection in the processed material. In some applications, one may use specific polymers for specific qualities such as thermal, mechanical, or low-cost, however, the refractive index difference between the materials (in the x, y, or z directions, or some combination thereof) may not be suitable to generate the desired amount of diffusion or other optical characteristic such as reflection. In these cases, it is known in the field to use small domains, typically less than 1 micron in size to increase or decrease the average bulk refractive index. Preferably, light does not directly scatter from these added domains, and the addition of these domains does not substantially increase the absorption or backscatter.

During production of the light homogenizer or one of its regions, the refractive index of the domains or the matrix or both may change due to crystallization, stress- or strain-induced birefringence or other molecular or polymer-chain alignment technique.

Additive materials can increase or decrease the average refractive index based on the amount of the materials and the refractive index of the polymer to which they are added, and the effective refractive index of the material. Such additives can include: aerogels, sol-gel materials, silica, kaolin, alumina, fine domains of $MgF_2$ (its index of refraction is 1.38), $SiO_2$ (its index of refraction is 1.46), $AlF_3$ (its index of refraction is 1.33-1.39), $CaF_2$ (its index of refraction is 1.44), LiF (its index of refraction is 1.36-1.37), NaF (its index of refraction is 1.32-1.34) and $ThF_4$ (its index of refraction is 1.45-1.5) or the like can be considered, as discussed in U.S. Pat. No. 6,773,801. Alternatively, fine domains having a high index of refraction, may be used such as fine particles of titania ($TiO_2$) or zirconia ($ZrO_2$) or other metal oxides.

Surface-Relief Structure

One or more surfaces of the light homogenizer may contain a non-planar surface. The surface profile may contain protrusions or pits that may range from 1 nm to 3 mm in the x, y, or z directions. The profile or individual features may have periodic, random, semi-random, or other uniform or non-uniform structure. The surface features may be designed to provide functions to the light homogenizer, such as collimation, anti-blocking, refraction, symmetric diffusion, asymmetric diffusion or diffraction. In some embodiments, the surface features are a linear array of prismatic structures that provide collimation properties. In another embodiment, the surface includes hemispherical protrusions that prevent wet-out or provide anti-blocking properties or light-collimating properties.

Collimation Properties

One or more surfaces of the light homogenizer may include surface profiles that provide collimation properties. The collimation properties direct light rays incident from large angles into angles closer to the display normal (smaller angles). The features may be in the form of a linear array of prisms, an array of pyramids, an array of cones, an array of hemispheres or other feature that is known to direct more light into the direction normal to the surface of the backlight. The array of features may be regular, irregular, random, ordered, semi-random or other arrangement where light can be collimated through refraction, reflection, total internal reflection, diffraction, or scattering.

Additional Light-Homogenizer Properties

The light homogenizer of this invention may contain materials, additives, components, blends, coatings, treatments, layers or regions that provide additional optical, mechanical, environmental, thermal or electrical benefits. The properties of the light homogenizer or a region of the light homogenizer may include one or more of the following:

Optical: increased optical throughput, increased/decreased diffusion along one or more axis, reduced or increased birefringence, increased luminance uniformity, improved color stability, reduced haze.

Mechanical/Physical: increase rigidity, reduced thickness, reduced weight, increased scratch resistance, reduced/increased pencil hardness, anti-blocking features, Environment: reduced warpage, increased light resistance, increased moisture resistance, increased light resistance, increased ultraviolet absorption, Thermal: increased thermal resistance, increased softening temperature.

Electrical: decreased surface resistance

Other properties that are known in the industry to improve the performance of a optical body, film, sheet, or plate may also be incorporated into one of these regions.

Light-Homogenizer Composition

The light homogenizer of this invention includes one or more light-scattering regions of a matrix material including dispersed domains. In another embodiment, the light-scattering region may include a region of light-scattering surface features that exhibit asymmetric scattering properties. In another embodiment, one or more of the diffusing regions may be an adhesive joining two or more components of the backlight system. The light homogenizer may also include a substrate that may be substantially optically transparent. The materials chosen for the substrate, dispersed, or continuous phases may be one or more polymeric or inorganic materials.

Such polymers include, but are not limited to acrylics, styrenics, olefins, polycarbonates, polyesters, cellulosics, and the like. Specific examples include poly(methyl methacrylate) and copolymers thereof, polystyrene and copolymers thereof, poly(styrene-co-acrylonitrile), polyethylene and copolymers thereof, polypropylene and copolymers thereof, poly(ethylene-propylene) copolymers, poly(vinyl acetate) and copolymers thereof, poly(vinyl alcohol) and copolymers thereof, bisphenol-A polycarbonate and copolymers thereof, poly(ethylene terephthalate) and copolymers thereof; poly (ethylene 2,6-naphthalenedicarboxylate) and copolymers thereof, polyarylates, polyamide copolymers, poly(vinyl chloride), cellulose acetate, cellulose acetate butyrate, cellulose acetate propionate, polyetherimide and copolymers thereof, polyethersulfone and copolymers thereof, polysulfone and copolymers thereof, and polysiloxanes.

Numerous methacrylate and acrylate resins are suitable for one or more phases of the present invention. The methacrylates include but are not limited to polymethacrylates such as poly(methyl methacrylate), poly(ethyl methacrylate), poly (propyl methacrylate), poly(butyl methacrylate), poly(isobutyl methacrylate), methyl methacrylate-methacrylic acid copolymer, methyl methacrylate-acrylate copolymers, and methyl methacrylate-styrene copolymers (e.g., MS resins). Suitable methacrylic resins include poly(alkyl methacrylate)s and copolymers thereof. In particular embodiments, methacrylic resins include poly(methyl methacrylate) and copolymers thereof. The acrylates include but are not limited to poly(methyl acrylate), poly(ethyl acrylate), and poly(butyl acrylate), and copolymers thereof.

A variety of styrenic resins are suitable for polymeric phases of the present invention. Such resins include vinyl aromatic polymers, such as syndiotactic polystyrene. Syndiotactic vinyl aromatic polymers useful in the present invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly (phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, suitable styrene resin polymers include polystyrene, poly(p-methyl styrene), poly(m-methyl styrene), poly(p-tertiary butyl styrene), poly(p-chlorostyrene), poly (m-chloro styrene), poly(p-fluoro styrene), and copolymers of styrene and p-methyl styrene. In particular embodiments, styrenic resins include polystyrene and copolymers thereof.

Particular polyester and copolyester resins are suitable for phases of the present invention. Such resins include poly (ethylene terephthalate) and copolymers thereof, poly(ethylene 2,6-naphthalenedicarboxylate) and copolymers thereof, poly(1,4-cyclohexandimethylene terephthalate) and copolymers thereof, and copolymers of poly(butylene terephthalate). The acid component of the resin can comprise terephthalic acid, isophthalic acid, 2,6-naphthalenedicarboxylic acid or a mixture of said acids. The polyesters and copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid. The glycol component of the resin can comprise ethylene glycol, 1,4-cyclohexanedimethanol, butylene glycol, or a mixture of said glycols. The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone. Suitable polyester resins include copolyesters formed by the reaction of a mixture of terephthalic acid and isophthalic acid or their equivalent esters with a mixture of 1,4-cyclohexanedimethanol and ethylene glycol. In particular embodiments, the polyester resins include copolyesters formed by the reaction of terephthalic acid or its equivalent ester with a mixture of 1,4-cyclohexanedimethanol and ethylene glycol.

Certain polycarbonate and copolycarbonate resins are suitable for phases of the present invention. Polycarbonate resins are typically obtained by reacting a diphenol with a carbonate precursor by solution polymerization or melt polymerization. The diphenol is preferably 2,2-bis(4-hydroxyphenyl)propane (so-called "bisphenol A"), but other diphenols may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3,5-dimethylphenyl-)propane, 2,2-bis(4-hydroxy-3-methylphenyl)propane, bis(4-hydroxyphenyl)sulfide and bis(4-hydroxyphenyl)sulfone. The polycarbonate resin can be a resin which comprises bisphenol A in an amount of 50 mol % or more, particularly 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Particularly suitable are phosgene and diphenyl carbonate.

A number of poly(alkylene) polymers are suitable for phases of the present invention. Such polyalkylene polymers include polyethylene, polypropylene, polybutylene, polyisobutylene, poly(4-methyl)pentene), copolymers thereof, chlorinated variations thereof, and fluorinated variations thereof.

Particular cellulosic resins are suitable for phases of the present invention. Such resins include cellulose acetate, cellulose acetate butyrate, cellulose acetate propionate, cellulose propionate, ethyl cellulose, cellulose nitrate. Cellulosic resins including a variety of plasticizers such as diethyl phthalate are also within the scope of the present invention.

Light Homogenizer Additives

Additives, components, blends, coatings, treatments, layers or regions may be combined on or within the aforementioned regions to provide additional properties. These may be inorganic or organic materials. They may be chosen to provide increased rigidity to enable support of additional films or backlight components. They may be chosen to provide increased thermal resistance so that the plate or film does not warp. They may be chosen to increase moisture resistance, such that the plate does not warp or degrade other properties when exposed to high levels of humidity. These materials may be designed to provide improved optical performance by reducing wet-out when in contact with other components in the backlight. Additives may be used to absorb ultra-violet radiation to increase light resistance of the product. They may be chosen to increase, decrease, or match the scratch resistance of other components in the display or backlight system. They may be chosen to decrease the surface or volumetric resistance of the light homogenizer or region of the light homogenizer to achieve anti-static properties.

The additives may be components of one or more layers of the light homogenizer. The additives may be coatings that are added onto a surface or functional layers that are a combined during the manufacturing process. The additives may be dispersed throughout the volume of a layer or coating or they could be applied to a surface.

Adhesives such as pressure-sensitive or UV-cured adhesives may also be used between one or more layers to achieve optical coupling. Materials known to those in the field of optical films, plates, diffuser plates, films and backlights to provide optical, thermal, mechanical, environmental, electrical and other benefits may be used in the volume or on a surface, coating, or layer of the light homogenizer or one of its regions. The adhesive layer may also contain symmetric, asymmetric, or a combination of symmetric and asymmetric domains in order to achieve desired light-scattering properties within the diffusion layer.

Anti-Static Additives

Anti-static monomers or inert additives may be added to one or more regions or domains of the light homogenizer. Reactive and inert anti-static additives are well known and well enumerated in the literature. High temperature quaternary amines or conductive polymers may be used. As an anti-static agent, stearyl alcohol, behenyl alcohol, and other long-chain alkyl alcohols, glyceryl monostearate, pentaerythritol monostearate, and other fatty acid esters of polyhydric alcohols, etc., may be used. In particular embodiments, stearyl alcohol and behenyl alcohol are used.

Light Homogenizer Location

The light homogenizer may be located in a backlight between the light-emitting sources and the display. In one embodiment, the light homogenizer is located between a linear array of light sources and a liquid crystal cell.

Light Homogenizer Size

The dimensions of the light homogenizer or an included region may extend to be substantially located between the light paths from the light sources to the display. In case of small displays, the light homogenizer may have a dimension in one direction of 1 cm or less, such as the case of a watch display. In larger displays, a dimension of the light homogenizer will, in general, be at least as large as one dimension of the final viewing screen. The thickness of the light homogenizer or a region may be from 7 mm to less than 100 microns. In a particular embodiment, a light homogenizer includes an anisotropic scattering region that is 200 microns in thickness optically coupled to a birefringent substrate that is approximately 1 mm in thickness. The capability of using a thin anisotropic scattering region to achieve sufficient diffusion for luminance uniformity allows for lower cost substrates to be used. Since the substrate can be substantially optically clear, low cost substrates may be used and they may have reduced weight, making lighter displays. The thin, asymmetrically diffusing layer also permits the capability of using a thinner substrate and therefore achieving a thinner backlight system.

Light Homogenizer Configuration

The light homogenizer includes at least one polarization-sensitive anisotropic light-scattering region and a second anisotropic light-scattering region that is substantially anisotropic. In some embodiments, the regions are located on both or either surface of a non-scattering region or substrate. Three anisotropic diffusing layers may also be used and they may be separated by substantially non-diffusing regions; the axes of the diffusing layers may be parallel, orthogonal or at an angle phi with respect to each other. The light homogenizer may include additional layers or elements to provide collimating properties or other optical, thermal, mechanical, electrical, and environmental properties discussed herein. One or more regions of the light homogenizer may not be optically coupled to a substrate or other component of the light homogenizer. The combination of layers or materials is included herein under the description of a light homogenizer even though one or more layers may be substantially free-standing and not physically coupled.

Method of Manufacturing of Light Homogenizer

The optical regions of the light homogenizer of this invention can include plates, sheets, coatings, and films of a variety of thicknesses; these structures may be manufactured using means such as film casting, sheet casting, profile extrusion, blown film extrusion, co-extrusion, injection molding, etc in accordance with embodiments of this invention. The light homogenizer may be used as an individual element or it may be combined with other materials or effects to provide an enhanced light homogenizer or backlight or display. The light homogenizer can be combined with other elements or contain features that improve the optical performance in terms of diffuse or specular transmission or reflection, gain, haze, clarity, backscatter, angular modification of the exiting light profile (reflecting or transmitting) in one or more directions, angular modification of the exiting (reflecting or transmitting) profile for at least one polarization state in one or more directions, percent of polarization preserved, and spectral transmission or absorption properties.

There are a number of different mechanisms for producing asymmetric diffusion profiles in the volume of the region. These include creating asymmetric region by aligning domains through stretching a material or stretching a material to cause domains to become symmetric in shape. Other methods of alignment such as extrusion and other methods known in the industry can be used.

In another embodiment of this invention, a surface relief structure that asymmetrically scatters incident light is created on one or more surfaces of a light homogenizer through film casting, sheet casting, profile extrusion, blown film extrusion, co-extrusion, injection molding. In one embodiment, the refractive index of the non-scattering region is substantially isotropic in one or more of the x, y, or z directions.

The light homogenizer can incorporate additional features or materials to provide additional optical qualities. Examples of features include an embossment on one or more surfaces of the substrate or diffuser with a regular, random, semi-random surface feature. This surface feature can be a diffractive, holographic, prismatic, microlens or other structure, as described above. Additives can be used within the material to improve a number of performance requirements, including optical, mechanical, thermal, and environmental resistance.

Backlight Configuration

The backlight of this invention includes a polarization-sensitive light homogenizer that contains one or more anisotropic scattering regions. The backlight may also include other layers, coatings, or regions that collimate a portion of the light from the light sources in a direction toward the normal of the backlight. In one embodiment of a backlight including a light homogenizer, a significant amount of light from the homogenizer is directed into an angular range $theta_1$ to $theta_2$ with respect to the normal of the backlight and one or more of the optical films may re-direct a substantial amount of the light from this angular range light toward the backlight normal.

In one embodiment of this invention, the backlight includes at least one PDALS region and one NPDALS region located between the light source and the display. The light source may be one or more fluorescent sources, organic LED's, inorganic LED's, photonic lattice LED's, photonic bandgap light sources, electroluminescent sources, carbon nanotube, FED, laser or other luminous sources known to be usable in display applications.

The shape and configuration of the light sources may be point sources such as discrete LED's, linear such as a linear array of CCFL lamps, grid arrays of LED's, serpentine shaped fluorescent bulbs, or a planar sources such as flat fluorescent lamps. The shape and configuration may be regular or irregular such that the resulting backlight system luminance is substantially uniform.

Collimating and Diffusing Films

One or more collimating films and diffuser films may be used within the backlight stack of this invention including a light homogenizer in order to achieve the desired luminance profile from the backlight and resulting display. In one preferred embodiment, a prismatic collimating film is used in the backlight to direct light from large angles in the vertical direction (as viewed in a typical television display application) toward the direction normal to the display. Two collimating films of linear arrays of prisms that are arranged perpendicular to each other (crossed prismatic films) may be used to further increase the amount of light directed perpendicular to the surface of the backlight or display. Diffusing films that contain surface features may provide collimating properties as well as diffusion properties. The diffusing properties may also help to reduce the visibility of features such as the tips of the prismatic arrays. In some embodiments, a diffusion film is located between the light homogenizer and the prismatic collimating film. In another embodiment, a diffuser film is located between the prismatic film and the display. In another embodiment, more than one diffuser film is located between the light homogenizer and the display and a prismatic film is not used.

Polarizers

Reflective polarizers may be used to improve the light recycling of the light homogenizer. This provides additional recycling of polarization that would normally be absorbed in the bottom polarizer of a liquid crystal display. Reflective polarizers may reflect linear or circularly polarized light. In some embodiments a linear reflective polarizer is used between the collimating film and liquid crystal display. In another preferred embodiment, a reflective polarizer is used between the light homogenizer and the display.

The different variations in features and designs of the light homogenizer backlight and method of manufacture described herein can be envisioned and include one or more combinations of the features described below:

1. Light sources: CCFL; LED; OLED; electroluminescent material; laser diode; carbon nanotube; fluorescent bulb; substantially planar fluorescent bulb; halogen bulb; incandescent bulb; metal halide bulb;
2. Light source color: Red; green; blue; white; cyan; magenta; yellow;
3. Light source location: in a plane substantially parallel to the display surface; beneath the display; one edge of the waveguide; more than one edge of a waveguide; opposite side of the waveguide than the liquid crystal cell; within the waveguide;
4. Light source configuration: linear array; grid array; regularly positioned; irregularly positioned; in red, green and blue clusters; color based arrays;
5. Spacing between light-scattering regions, collimating films, display, polarizers, diffuser films, and diffusing plates: air gap; optically coupled.
6. Scattering region:
    a. Scattering region location: above the light source; beneath the display; above collimating film(s); below collimating film(s); in-between collimating films; within the collimating structures; in the substrate of the collimating structures; on the surface of the light homogenizer; within the volume of the light homogenizer; in regions of the substrate or collimating structures separated by a non-scattering region; within a polarizer; on the surface of a polarizer; within an adhesive layer;
    b. Diffusing domain shapes: symmetric domains; asymmetric domains; a combination of asymmetric and symmetric domains.
    c. Diffusing domains refractive index: average refractive index $n_d$ wherein $|n_d-n_m|>0.001$; domain refractive index $n_{dx}$, $n_{dy}$, and $n_{dz}$ in the x, y, and z directions, respectively, and matrix refractive index $n_{mx}$ and $n_{my}$ and $n_{mz}$ in the x, y, and z directions respectively, wherein $|n_{dx}-n_{mx}|>0.01$; $|n_{dy}-n_{my}|>0.01$; or $|n_{dz}-n_{mz}|>0.01$; $|n_{dx}-n_{mx}|<0.005$; $|n_{dy}-n_{my}|<0.005$; or $|n_{dz}-n_{mz}|<0.005$;

d. Diffusing domains concentration: less than 1% by weight; greater than 1% and less than 40% by weight; between 40% and 50% by weight; greater than 50% by weight;

e. Asymmetric domain alignment: substantially parallel to an edge of the display; substantially perpendicular to an edge of the display; or at an angle beta with respect to an edge of the display; substantially parallel to an array of light sources; substantially perpendicular to a an array of light sources or at an angle beta with respect to an array of light sources; substantially parallel to an array of collimating features; substantially perpendicular to a an array of collimating features or at an angle beta with respect to an array of collimating features.

7. Collimating region type: Prismatic; microlens; pyramidal; conical; hemispherical; array of refractive features; array of diffractive features; array of light-scattering features;

8. Collimating region orientation: substantially parallel to an array of light sources; substantially perpendicular to a an array of light sources or at an angle beta with respect to an array of light sources; substantially parallel to an edge of the display; substantially perpendicular to an edge of the display; or at an angle beta with respect to an edge of the display;

9. Light redirecting region type: Prismatic; microlens; pyramidal; conical; hemispherical; array of refractive features; array of diffractive features; array of light-scattering features;

10. Light redirecting region orientation: substantially parallel to an array of light sources; substantially perpendicular to a an array of light sources or at an angle beta with respect to an array of light sources; substantially parallel to an edge of the display; substantially perpendicular to an edge of the display; or at an angle beta with respect to an edge of the display;

11. Light-collimating region or light-redirecting region containing arrays of prisms:
    a. Prism Pitch: Constant; non-constant (irregular); random.
    b. Prism Orientation: At an angle, phi, with respect to a predetermined edge; or at an angle phi2, wherein phi2 varies across the length of the prisms.
    c. Prism height: Constant; varying lengthwise across the length of the prisms; varying from one prism to another.
    d. Prism Apex angle: At a constant angle, alpha; or at an angle alpha2, wherein alpha2 varies across the length of the prisms; or at an angle alpha3, wherein alpha3 can vary from one prismatic structure to the next
    e. Prism structure refractive index: $n_m$, with the region in optical contact with the prism structure having a refractive index $n_1$ wherein $n_m > n_1$.
    f. Surface structure on sheet face opposite prism face: planar; prismatic; microlens array; surface relief structure providing pre-determined angular scattering (included ruled structure, holographic diffuser); any combination of the above structures.

12. Polarization-sensitive light-scattering region type: Reflective; absorptive; linear; circular; partially reflective and absorptive;

13. Polarization-sensitive light-scattering region location: between the display and light source; between a collimating film and the light homogenizer; between a diffuser film and a collimating film; between the light homogenizer and a diffuser film;

Preferred embodiments of the present invention are illustrated in the following Example(s). The following examples are given for the purpose of illustrating the invention, but not for limiting the scope or spirit of the invention.

EXAMPLE 1

The polarization-sensitive light homogenizer shown in FIG. 2 includes a PDALS region optically coupled to a substantially transparent, non-diffusing substrate that is optically coupled to a NPDALS region. The NPDALS region contains asymmetric light-scattering domains that are aligned such that they will be parallel to a linear array of CCFL's when the light homogenizer is used in a backlight. The light homogenizer can be created by co-extruding, casting or coating, the mixture containing the domains onto a transparent non-scattering substrate such as polyester (PET). A blend of materials containing a 30% by weight of dispersed domains of a styrene-butadiene core with a PMMA (polymethyl methacrylate) outer shell (PARALOID EXL 3647 from Rohm and Haas) and a 70% by weight polyester (EASTAR EN076 PET from Eastman Chemical Company) is made by dispersing the domains in a twin screw extruder and pelletizing, hereafter referred to as blend P. A second blend containing 30% by weight dispersed domains of linear low-density polyethylene (OCTENE SLLDPE from Nova Chemical) in a matrix of 70% by weight of co-polyester (SPECTAR 14471 from Eastman Chemical), hereafter referred to as blend N. A multilayer film is co-extruded using three single screw extruders with a configuration of blend P/100% EASTAR EN076/blend N onto a cast roll at a layer thickness of 300 μm, 300 μm, and 300 μm respectively. The resulting film is stretched in the machine direction (MD orientation) by 4×, resulting in film 225 μm in thickness. The NPDALS region is formed from blend N, and the PDALS region is formed from blend P. The middle region is a birefringent layer of PET. When combined with a linear array of fluorescent light bulbs, the uniformity in the direction perpendicular to the light sources is improved and the percentage of polarized light output is improved relative to a NPDALS region of similar composition and thickness without a PDALS region.

EXAMPLE 2

The polarization-sensitive light homogenizer, can be produced as illustrated in FIG. 3 that is designed to have increased optical efficiency and increased luminance in the direction normal to the homogenizer due to increased light collimation provided by a light collimating region. The light homogenizer of Example 1 is coated with a UV curing adhesive (Optical Adhesive 68 from Norland). A tool of a linear array of 90-degree prisms at 50-micron pitch is placed in contact with the adhesive and is exposed to UV light to cure the adhesive, and the tool is removed. The resulting light homogenizer including a light-collimating region has increased luminance in the direction normal to the homogenizer when illuminated with the linear array of fluorescent bulbs compared to that of the Example 1.

EXAMPLE 3

The polarization-sensitive light homogenizer, can be produced as illustrated in FIG. 9 and can be combined with an edge-illuminated waveguide to provide improved optical efficiency, increased luminance in the direction normal to the backlight, and increased spatial luminance uniformity. The light homogenizer of Example 2 is further modified to include a light re-directing region including a linear array of prisms. The light homogenizer of Example 2 is coated on the planar surface with a UV curing adhesive (Optical Adhesive 68 from Norland). A tool of a linear array of 90-degree prisms 50-micron pitch is placed in contact with the adhesive, and UV light is exposed to cure the adhesive and the tool is removed. The resulting polarization-sensitive light homogenizer is place above a linear array of LED's directed toward the edge of an acrylic waveguide with an array of printed light-scattering dots. The light from the waveguide is efficiently directed into the light homogenizer, and the resulting backlight is thin and has increased luminance in the direction normal to the homogenizer and has a spatially uniform luminance.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:

1. An optical element comprising:
   a) a plurality of asymmetrically shaped domains dispersed in a matrix;
   b) wherein said asymmetrically shaped domains comprise a coating; and
   c) said matrix comprises a matrix material with a refractive index $n_{mx}$, $n_{my}$, and $n_{mz}$, in the x, y, and z mutually orthogonal directions, respectively; and
   d) said coating comprises a coating material with a refractive index $n_{cx}$, $n_{cy}$, and $n_{cz}$, in the x, y, and z directions, respectively; and
   e) said plurality of asymmetrically shaped domains comprise a domain material with a refractive index $n_{dx}$, $n_{dy}$, and $n_{dz}$ in the x, y, and z directions, respectively;
   f) wherein $|n_{my}-n_{dy}|>0.01$ or $|n_{mx}-n_{dx}|>0.01$.

2. The optical element of claim 1 wherein the angular full width at half maximum diffusion intensity for collimated light incident on the optical element is larger for light of blue wavelengths than longer visible wavelengths.

3. The optical element of claim 1 wherein the plurality of asymmetrically shaped domains are fibrous in shape, each with longer average dimensions in the y direction than the x or z directions, and the average dimensions in the x and z directions are greater than 0.5 microns.

4. The optical element of claim 3 wherein the thickness in microns of the coating in the x direction, Tx, is defined by the equation:

$$T_x = \sqrt{R_x^2 + \left(\frac{2n+1}{4}\psi\right)^2 + \frac{\sqrt{2}}{4}(2n+1)} - R_x,$$

where $R_x$ is the average radius in microns of each region comprising the domain material of the plurality of asymmetrically shaped domains in the x direction, n is an integer not less than 0, and $\psi$ is a range from 0.4 microns to 0.7 microns.

5. The optical element of claim 4 wherein $n_{cx}$ is approximately equal to $\sqrt{(n_{dx} \times n_{mx})}$, or $n_{cy}$ is approximately equal to $\sqrt{(n_{my} \times n_{dy})}$.

6. The optical element of claim 4 wherein $|n_{mx}-n_{dx}|<0.005$ and $|n_{my}-n_{dy}|>0.01$ or $|n_{my}-n_{dy}|<0.005$ and $|n_{mx}-n_{dx}|>0.01$.

7. A light emitting device comprising the optical element of claim 5 and a light source.

8. The optical element of claim 4 wherein the visible light backscatter from the optical element is less than the backscatter from a similar optical element without the coating.

9. The optical element of claim 5 further comprising a surface relief structure on at least one surface.

10. The optical element of claim 5 wherein the optical thickness of the coating is $\lambda/4$ where $\lambda$ is within the range of 0.4 microns to 0.7 microns.

11. The optical element of claim 10 wherein the glass transition temperature of the domain material is greater than the glass transition temperature of the matrix material.

12. The optical element of claim 10 wherein the optical element is an optical film with a flexural modulus greater than 4 GPa.

13. A light emitting device comprising the optical element of claim 10.

14. The optical element of claim 10 wherein the transmitted light from a collimated visible light source has an angular asymmetry ratio greater than 2.

15. The optical element of claim 11 wherein the plurality of asymmetrically shaped domains are glass fibers.

16. An optical element comprising:
   a) a matrix comprising a matrix material with a refractive index $n_{mx}$, $n_{my}$, and $n_{mz}$, in the x, y, and z mutually orthogonal directions, respectively;
   b) a plurality of asymmetrically shaped domains dispersed in the matrix comprising a domain material with a refractive index $n_{dx}$, $n_{dy}$, and $n_{dz}$ in the x, y, and z directions, respectively;
   wherein $|n_{mx}-n_{dx}|<0.005$ and $|n_{my}-n_{dy}|>0.01$, or $|n_{my}-n_{dy}|<0.005$ and $|n_{mx}-n_{dx}|>0.01$.

17. The optical element of claim 16 wherein said plurality of asymmetrically shaped domains comprise a coating of a coating material with a refractive index $n_{cx}$, $n_{cy}$, and $n_{cz}$, in the x, y, and z directions, respectively.

18. The optical element of claim 16 wherein the angular full width at half maximum diffusion intensity for collimated light incident on the optical element is larger for light of blue wavelengths than longer visible wavelengths.

19. The optical element of claim 16 wherein the plurality of asymmetrically shaped domains comprise birefringent or trirefringent polymer fibers.

20. The optical element of claim 16 wherein the optical element is an optical film and the matrix material is birefringent or trirefringent.

21. The optical element of claim 16 wherein $|n_{mx}-n_{dx}|<0.005$ and $|n_{my}-n_{dy}|>0.01$ and the optical element transmits s-polarized light linear polarized parallel to the x direction substantially un-scattered, and s-polarized light linear polarized parallel to the y direction is substantially scattered.

22. The optical element of claim 16 wherein $|n_{my}-n_{dy}|<0.005$ and $|n_{mx}-n_{dx}|>0.01$ and the optical element transmits s-polarized light linear polarized parallel to the y direction substantially un-scattered, and s-polarized light linear polarized parallel to the x direction is substantially scattered.

23. An anisotropically scattering film comprising a plurality of dispersed domains wherein the anisotropically scattering film scatters light of a first linear polarization state into angles with a higher angular full width at half maximum intensity than light of a second linear polarization state orthogonal to the first linear polarization state; and the plurality of the dispersed domains have a coating with an optical thickness $\lambda/4$ where $\lambda$ is within the range of 0.4 microns to 0.7 microns.

* * * * *